United States Patent [19]

Ohta

[11] Patent Number: 5,396,237
[45] Date of Patent: Mar. 7, 1995

[54] DEVICE FOR SUBBAND CODING WITH SAMPLES SCANNED ACROSS FREQUENCY BANDS

[75] Inventor: Mutsumi Ohta, Tokyo, Japan

[73] Assignee: NEC Corporation, Tokyo, Japan

[21] Appl. No.: 247,464

[22] Filed: May 23, 1994

Related U.S. Application Data

[63] Continuation of Ser. No. 830,335, Jan. 31, 1992, abandoned.

[30] Foreign Application Priority Data

Jan. 31, 1991 [JP] Japan .................................. 3-031502

[51] Int. Cl.$^6$ ............................................. H03M 7/00
[52] U.S. Cl. ............................................. 341/50; 341/63
[58] Field of Search ................................. 341/50, 63

[56] References Cited

U.S. PATENT DOCUMENTS

| | | | |
|---|---|---|---|
| 4,956,871 | 9/1990 | Swaminathan | 381/31 |
| 4,963,030 | 10/1990 | Makur | 358/133 |
| 5,010,405 | 4/1991 | Schreiber et al. | 358/141 |
| 5,115,240 | 5/1992 | Fujiwara et al. | 341/51 |
| 5,150,387 | 9/1992 | Yoshikawa et al. | 375/122 |
| 5,151,941 | 9/1992 | Nishiguchi et al. | 381/46 |
| 5,161,210 | 11/1992 | Druyvesteyn et al. | 395/2 |

*Primary Examiner*—Marc S. Hoff
*Attorney, Agent, or Firm*—Foley & Lardner

[57] ABSTRACT

In a subband coding device for coding a digital device input signal which is a one-dimensional or a two-dimensional signal, a single coding circuit is used instead of a conventional combination of coders and a multiplexer. The coding circuit is for coding subband samples of different frequency bands in each sample group across the frequency bands, as by starting from a lowest frequency band and ending at a highest frequency band or reversedly, and preferably with attention directed to correlation which the subband samples have between two adjacent frequency bands. Zero-level components of the subband samples are preferably run-length coded. When the subband samples of each sample group have a tree structure including subtrees, the subband samples are preferably scanned from a subtree to another subtree either starting at or ending at the subband sample of the lowest frequency band.

12 Claims, 15 Drawing Sheets

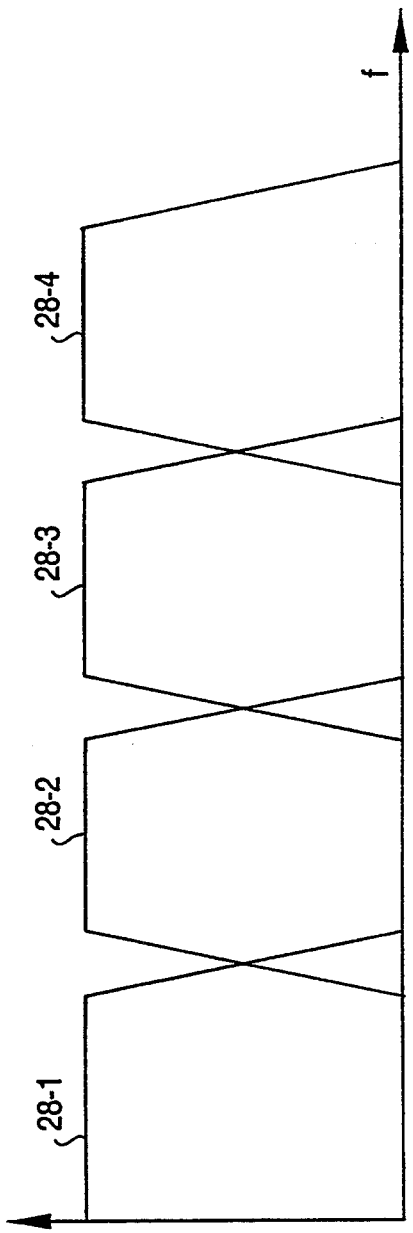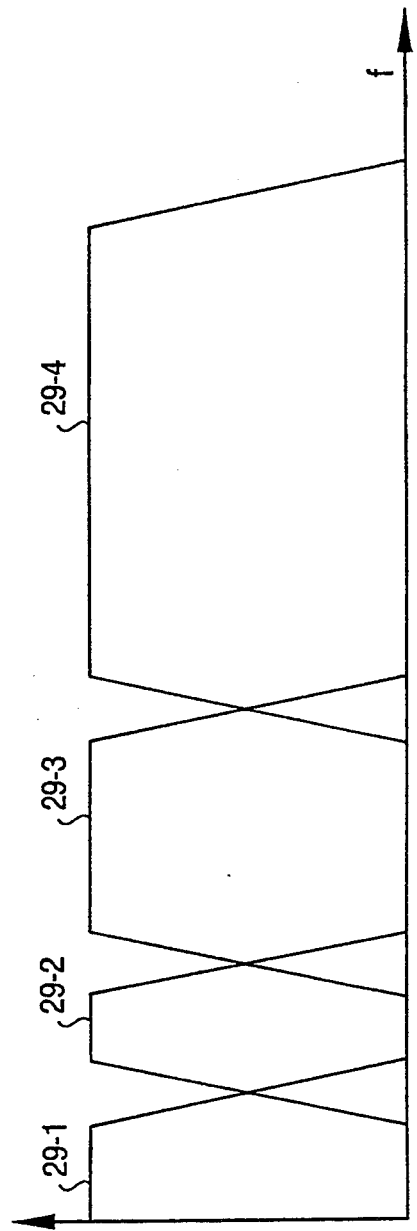

DEVICE FOR SUBBAND CODING WITH SAMPLES SCANNED ACROSS FREQUENCY BANDS

This application is a continuation of application Ser. No. 07/830,335, filed Jan. 31, 1992, now abandoned.

BACKGROUND OF THE INVENTION

This invention relates to a subband coding device for use in subband coding a digital device input signal into a subband coded signal.

In the manner which will later be described in more detail, a conventional subband coding device comprises a bank of first through N-th band-pass filters for band-limiting the device input signal into first through N-th band-limited signals having first through N-th frequency bands which are different in frequency from one another, where N represents a predetermined natural number. The device input signal represents original signal samples which are sampled at signal sampling instants and are variable either in a one-dimensional space, namely, along a time axis, or in a two-dimensional space, namely, dependent on signal points in each signal plane.

First through N-th downsampling circuits are used to downsample the first through the N-th band-limited signals into first through N-th sequences of subband samples. First through N-th coders are used to encode the subband samples of the first through the N-th sequences individually into first through N-th coded signals. A multiplexer is used to multiplex the first through the N-th coded signals into the subband coded signal.

Such a subband coding device is for coding the device input signal into the subband coded signal with a high coding efficiency. The present inventor has, however, found it possible to make the subband coding device of the type described have an astonishingly high encoding efficiency.

SUMMARY OF THE INVENTION

It is consequently an object of the present invention to provide a subband according device which has a highest possible coding efficiency.

Other objects of this invention will become clear as the description proceeds.

On setting forth the gist of this invention, it is possible to understand that a subband coding device includes band-pass filters for band-limiting a device input signal into band-limited signals having different frequency bands and downsampling circuits for downsampling the band-limited signals into subband samples, where the device input signal represents signal samples which are variable in one of a one-dimensional or a two-dimensional space.

According to this invention, the above-understood subband coding device comprises coding means for coding the subband samples into a subband coded signal by classifying the subband samples into a plurality of sample groups of classified samples and by scanning the classified samples of each of the sample groups across the frequency bands, where the classified samples of the sample groups are selected from the subband samples in accordance with sampling instants of the signal samples and in accordance with combinations of the sampling instants when the signal samples are variable in the one-dimensional and the two-dimensional spaces, respectively.

BRIEF DESCRIPTION OF THE DRAWING

FIG. 2 schematically shows frequency bands which are for use in a subband coding device in general in band-limiting a one-dimensional input signal;

FIG. 3 schematically shows frequency bands of the type illustrated in FIG. 2;

DESCRIPTION OF THE PREFERRED EMBODIMENTS

Figure 1:
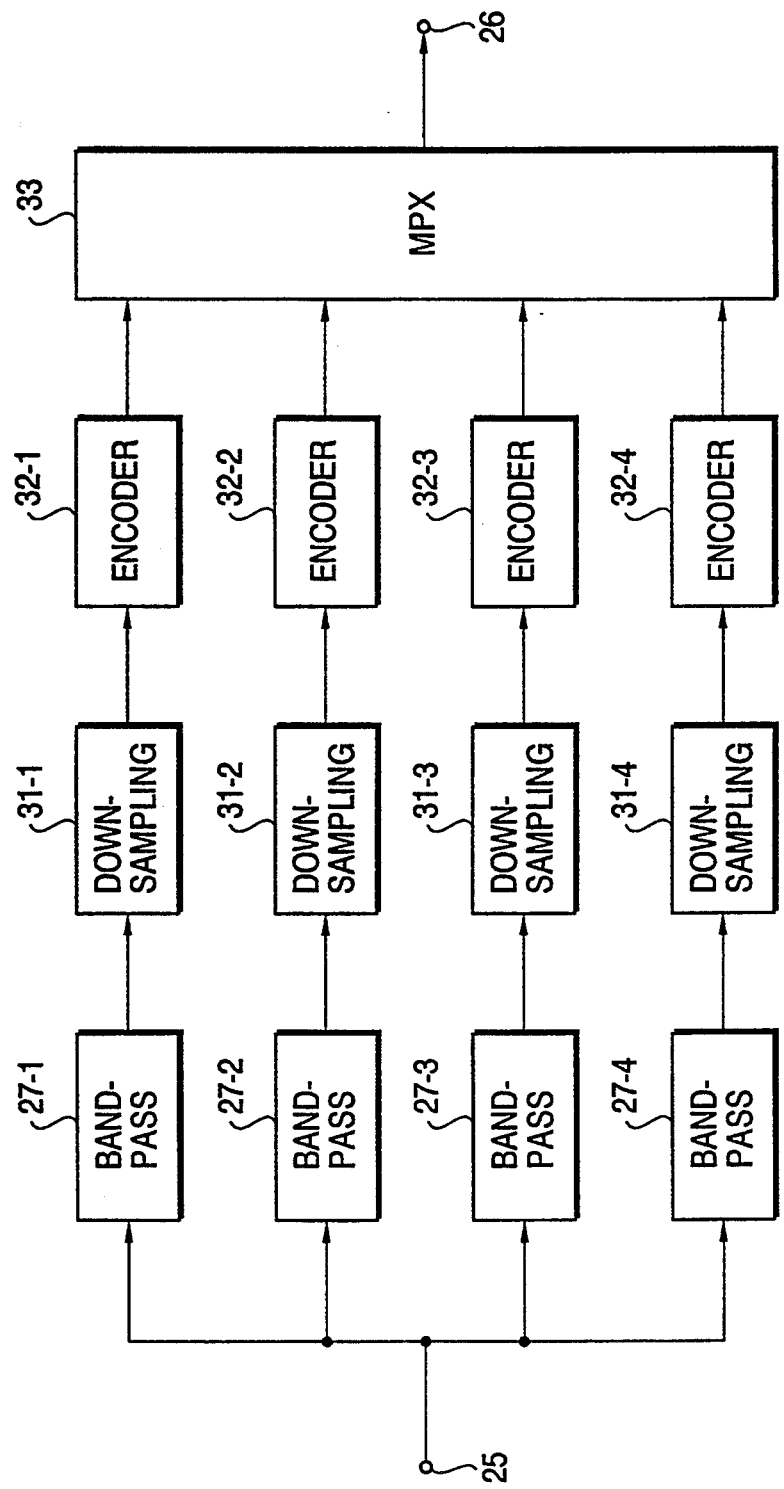
FIG. 1 is a block diagram of a conventional subband coding device.

Referring to FIGS. 1 through 3, a conventional subband coding device will first be described in order to facilitate an understanding of the present invention. The subband coding device has device input and output terminals 25 and 26. The device input terminal 25 is supplied with a device input signal which is either a one-dimensional input signal or a two-dimensional input signal and which is a digital signal as will presently become clear. Such a device input signal has an original bandwidth and represents original signal samples which are sampled at signal sampling instants defined by a sampling signal. The subband coding device is for supplying a subband coded signal to the device output terminal 26 as a device output signal.

When the device input signal is the one-dimensional input signal, such as a speech signal, which varies one-dimensionally, the original signal samples are variable one-dimensionally. When the device input signal is the two-dimensional input signal, such as a picture signal, which varies two-dimensionally, the original signal samples are variable two-dimensionally. In other words, the original signal samples are variable in one of a one-dimensional space, namely, along a time axis, and a two-dimensional space, namely, dependent on signal points defined by the signal sampling instants on each signal plane. It will be presumed for the time being that the device input signal is one-dimensionally variable. Another case will presently be described where the device input signal is two-dimensionally variable.

In the example being illustrated, first through fourth band-pass filters 27-1, 27-2, 27-3, and 27-4 are connected to the device input terminal 25 and have first through fourth passbands which are different in frequency from one another. More particularly, the first through the fourth passband are in first through fourth frequency bands and may have a common bandwidth into which the original bandwidth is equally divided in the manner illustrated in FIG. 2 at 28-1, 28-2, 28-3, and 28-4 with frequency f scaled along the abscissa. The common bandwidth is equal to a quarter of the original bandwidth.

Alternatively, the first through the fourth passbands or frequency bands may have first through fourth bandwidths which are different in bandwidth in the manner exemplified in FIG. 3 at 29-1, 29-2, 29-3, and 29-4 and into which the original bandwidth is hierarchically or stratificationally divided. More specifically, the first and the second bandwidths have a common bandwidth in the example being illustrated. The third bandwidth is twice as wide as the common bandwidth of the first and the second bandwidths. The fourth bandwidth is twice as wide as the third bandwidth. Under the circumstances, the first through the fourth bandwidths are equal to one eighth, again one eighth, a quarter, and a half of the original bandwidth.

It should be noted in connection with the above that a bank of the band-pass filters 27 (suffixes omitted) should be a perfect reconstruction filter assembly. Each of the first through the fourth band-pass filters 27 is therefore preferably one of a quadrature mirror filter (QMF), a Conjugate Quadrature Filter (CQF) and a Wavelet Filter which are all known in the art. In any event, the first through the fourth band-pass filters 27 are for use in band-limiting the device input signal into first through fourth band-limited signals or subband or frequency-band signals.

So band-limiting, each of the first through the fourth band-pass filters 27 converts the original signal samples into converted samples (herein not shown) by converting their frequencies into converted frequencies. The converted samples are distributed according to their converted frequencies in the first through the fourth band-limited signals.

First through fourth downsampling or subsampling circuits 31-1, 31-2, 31-3, and 31-4 are connected to the first through the fourth band-pass filters 27 and are for downsampling the converted samples of the first through the fourth band-limited signals at downsampling timings defined by a downsampling signal. The first through the fourth downsampling circuits 31 (suffixes omitted) are for thereby producing first through fourth sample sequences of subband or downsampled samples. It should be noted that the first through the fourth downsampling circuits 31 are for downsampling the first through the fourth band-limited signals at first through fourth ratios which are proportional to the first through the fourth bandwidths.

More in detail, the first through the fourth ratios are equal to a common ratio of one to four when the first through the fourth bandwidths 28 (suffixes omitted) have the common bandwidth in the manner illustrated with reference to FIG. 2. The first through the fourth ratios are equal to one to eight, one to eight, one to four, and one to two when the first through the fourth bandwidths 29 (suffixes omitted) are those illustrated with reference to FIG. 3.

First through fourth coders 32-1, 32-2, 32-3, and 32-4 are connected to the first through the fourth downsampling circuits 31 and are for coding the first through the fourth sample sequences of the subband samples into first through fourth coded signals. A multiplexer 33 is connected to the first through the fourth coders 32 (suffixes omitted) to multiplex the first through the fourth coded signals into the subband coded signal for supply to the device output terminal 26.

It is now understood that a combination of the first through the fourth encoders 32 and the multiplexer 33 serves as a coding section in the conventional subband coding device. Connected to the first through the fourth downsampling circuits 31, the coding section (32, 33) of the prior art is for coding the first through the fourth sample sequences individually into the first through the fourth coded signals and for multiplexing the first through the fourth coded signals into the subband coded signal.

Figure 4:
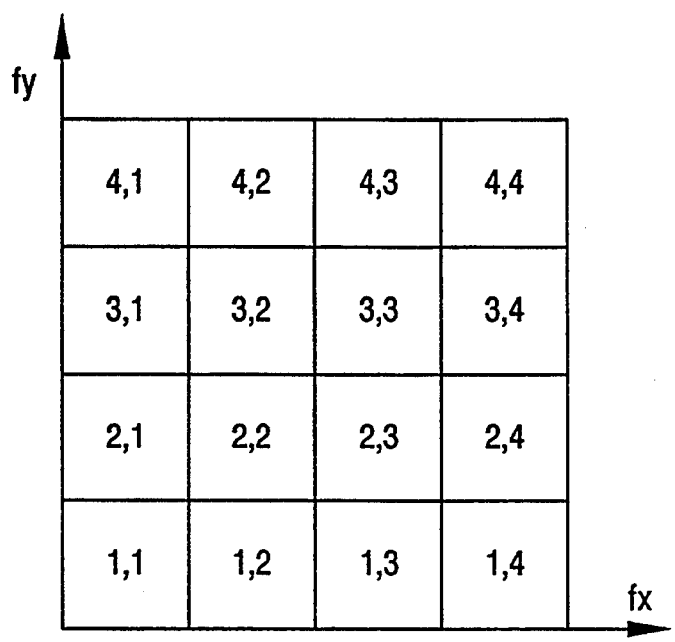
FIG. 4 schematically shows frequency bands which are for use in a subband coding device in general in band-limiting a two-dimensional input signal.
Figure 5:
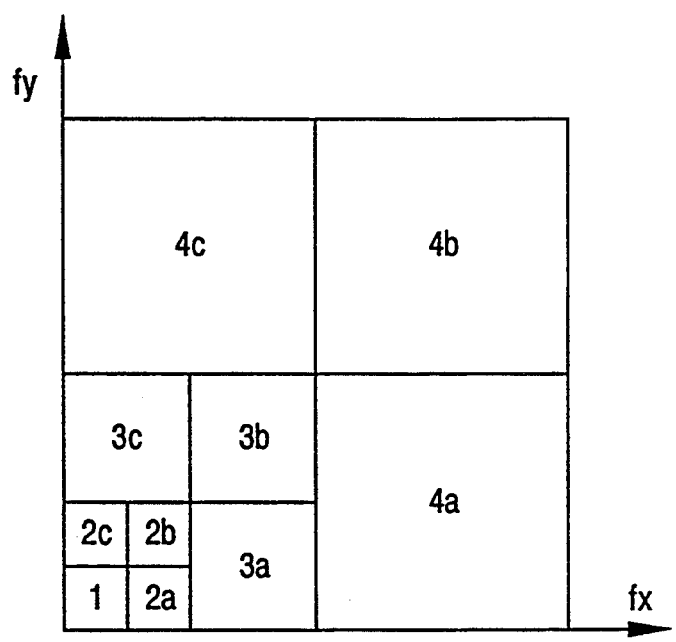
FIG. 5 schematically shows frequency bands of the type depicted in FIG. 4.

Turning to FIGS. 4 and 5, it will now be presumed that the device input signal is the two-dimensional input signal. In other words, the original signal samples are placed at signal points, such as picture elements, on a signal plane. It will be surmised without loss of generality that the signal plane is an orthogonal x-y plane which is defined by horizontal and vertical frequencies fx and fy.

In FIG. 4, the original bandwidth is equally divided into (1, 1)-th, (1, 2)-th, (1, 3)-th, (1, 4)-th, (2, 1)-th, ..., (4, 3)-th, and (4, 4)-th frequency bands which are sixteen in number and may alternatively be called first through sixteenth frequency bands. As in FIG. 2, the first through the sixteenth frequency bands have a common bandwidth.

In FIG. 5, the original bandwidth is hierarchically divided into first, (2a)-th, (2b)-th, (2c)-th, (3a)-th, ..., (4b)-th, and (4c)-th frequency bands or first, second primary, second secondary, second tertiary, third primary, . . . , fourth secondary, and fourth tertiary frequency bands which are ten in total and may alternatively be called first through tenth frequency bands. As in FIG. 3, the first through the tenth frequency bands have first through tenth bandwidths which are different bandwidths. In particular, the bandwidths of the first frequency band, each of the second through the fourth frequency bands, each of the fifth through the seventh frequency bands, and each of the eighth through the tenth frequency bands may simply be referred to as first through fourth bandwidths. The fourth bandwidth is equal to a quarter of the original bandwidth. The third bandwidth is equal to one sixteenth of the original bandwidth. Each of the first and the second bandwidths is equal to one sixty-fourth of the original bandwidth.

Turning back to FIG. 1, the conventional subband coding device is not different in outline from that illustrated above except for the numbers of the band-pass filters 27 and others, the passbands, and ratios of downsampling, and the like even when the device input signal is the two-dimensional input signal. When the device input signal should be band-limited in the manner illustrated with reference to FIG. 4, the band-pass filters 27 should be sixteen in number and can be called first through sixteenth band-pass filters. This applies to the band-limited signals, the downsampling circuit 31, the coders 32, and the coded signals. The first through the sixteenth downsampling circuit 31 should downsample the converted samples into the subband samples of first through sixteenth sample sequences at a common ratio of one to sixteen.

When the device input signal should be band-limited in the manner described in conjunction with FIG. 5, the band-pass filters 27 should be ten in number and can be called first through tenth band-pass filters. This applies to the downsampling circuits 31, the encoders 32, and the encoded signals.

Under the circumstances, the first downsampling circuit is for downsampling a first band-limited signal having the first bandwidth at a first ratio into the subband samples of a first sample sequence. Into the subband samples of second through fourth sample sequences, the second through the fourth downsampling circuits downsample, at a second ratio in common, second through fourth band-limited signals having the second bandwidth in common. Into the subband samples of fifth through seventh sample sequences, the fifth through the seventh downsampling circuits downsample, at a third ratio in common, fifth through seventh band-limited signals having the third bandwidth in common. Into the subband samples of eighth through tenth sample sequences, the eighth through the tenth downsampling circuits downsample, at a fourth ratio in common, eighth through tenth band-limited signals having the fourth bandwidth in common.

In the manner described above, the first through the fourth ratios are proportional to the first through the fourth bandwidths. Each of the first and the second ratios is therefore equal to one to sixty-four. The third ratio is equal to one to sixteen. The fourth ratio is equal to one to four.

It is now appreciated that such a subband coding device comprises first through N-th band-pass filters 27 and first through N-th downsampling circuits 31 in general, where N represents a predetermined natural number. When the device input signal is band-limited in the manner exemplified in conjunction with FIGS. 2 and 3, the predetermined natural number is equal to four. When the device input signal is band-limited in the manner described in connection with FIGS. 4 and 5, the predetermined natural number is equal to sixteen and ten.

In the manner pointed out heretobefore, the conventional subband coding device has a high efficiency of coding. The present inventor has, however, found and confirmed that a subband coding device can be given an unexpectedly high efficiency of coding.

Figure 6:
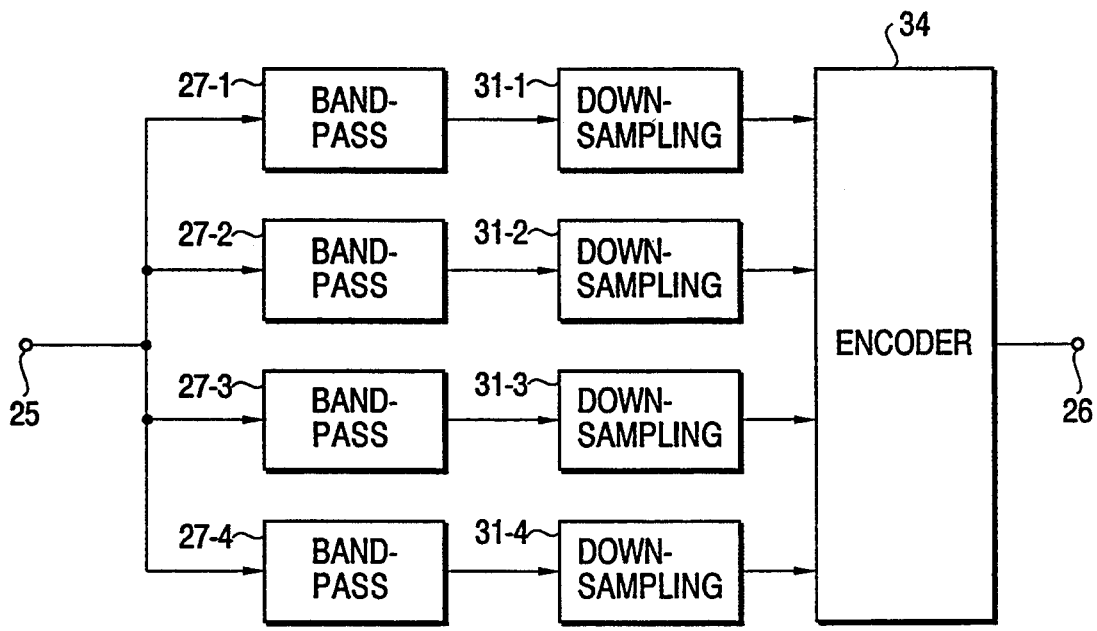
FIG. 6 is a block diagram of a subband coding device according to a first embodiment of the instant invention.

Referring now to FIG. 6 with FIGS. 2 through 5 continually referred to, the description will proceed to a subband coding device according to a first embodiment of the present invention. The subband coding device comprises similar parts which are designated by like reference numerals and are similarly operable with likewise named signals. It will first be assumed merely for simplicity of the description that the predetermined natural number N is equal to four.

In FIG. 6, a single coder 34 is used instead of a combination of the first through the fourth coders 32 and the multiplexer 33 which are described in conjunction with FIG. 1. The single coder 34 is therefore connected to the first through the fourth downsampling circuits 31-1 to 31-4 and serves as a coding section of the subband coding device according to this invention.

In the manner which will become clear as the description proceeds, the coding section (34) is for coding the subband samples of the first through the fourth sample sequences directly into the subband coded signal. As in FIG. 1, the subband coded signal is delivered from the coding section (34) to the device output terminal 26.

More particularly, the coder 34 classifies the subband samples of the first through the fourth sample sequences into classified samples of a sequence of sample groups. Except for sample values which the classified samples are representative of, the sample groups of the sequence are identical with one another and are successively formed as a time sequence. In the meantime, the classified samples of each sample group are scanned across the first through the fourth frequency bands in the manner which becomes clear in the following.

It should be noted that the classified samples are not different from the subband samples although differently named. When the original signal samples are variable in the one-dimensional space, the classified samples of each sample group are selected from the subband samples of the first through the fourth sample sequences in accordance with the downsampling instants by using the downsampling signal. In other words, the subband samples of the sample sequences are rearranged as the classified samples of the sample groups in compliance with the downsampling instants. When the original signal samples are variable two-dimensionally, the subband samples of the sample sequences are likewise rearranged as the classified samples of the sample groups in accordance with combinations of the downsampling instants.

Figure 7:
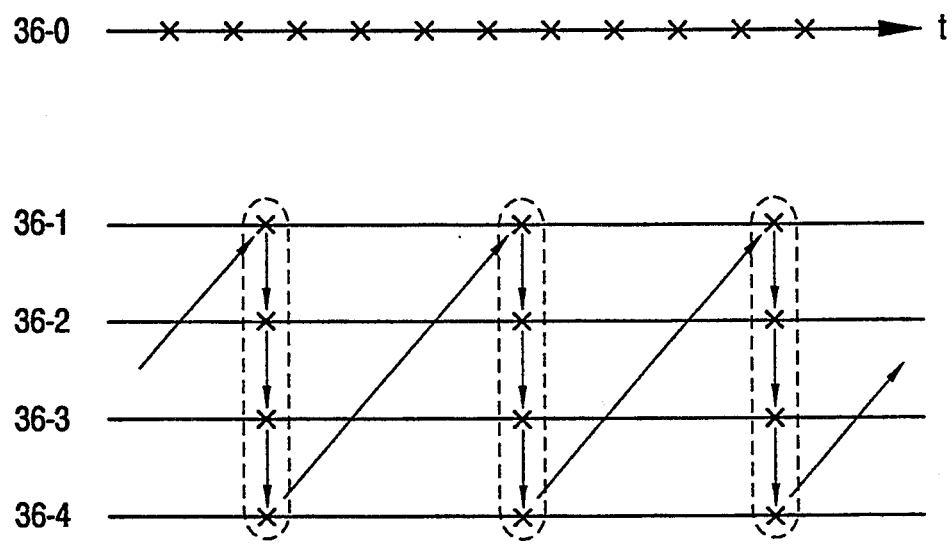
FIG. 7 schematically shows frequency bands which have a common bandwidth and in which subband samples are derived from a one-dimensional input signal.

Referring to FIG. 7 wherein the abscissa represents time t, it will be presumed that the original bandwidth is equally divided into the first through the fourth frequency bands in the manner illustrated with reference to FIG. 2. The converted samples are now illustrated by crisscrosses along a zeroth or top line labelled 36-0 with the downsampling instants used along the time axis instead of the signal sampling instants merely for convenience of illustration. The first through the fourth frequency bands are depicted at 36-1, 36-2, 36-3, and 36-4 along first through fourth lines below the zeroth line.

The first through the fourth downsampling circuits 31 (FIG. 6) are operable to downsample the converted samples of the first through the fourth band-limited signals at the common ratio of one to four in an inphase manner into the classified samples of the sample groups so that the classified samples of each of the sample groups may have a common time position across the first through the fourth frequency bands 36 (suffixes 1 through 4 omitted). The classified samples of each sample group are enclosed with a dashed-line loop.

It will be observed that the common time position has a shift of a half downsampling interval relative to the original signal samples depicted as the converted samples in the manner noted in the foregoing. This is because the quadrature mirror filter is used as each of the first through the fourth band-pass filters 27 (FIG. 6).

Figure 8:
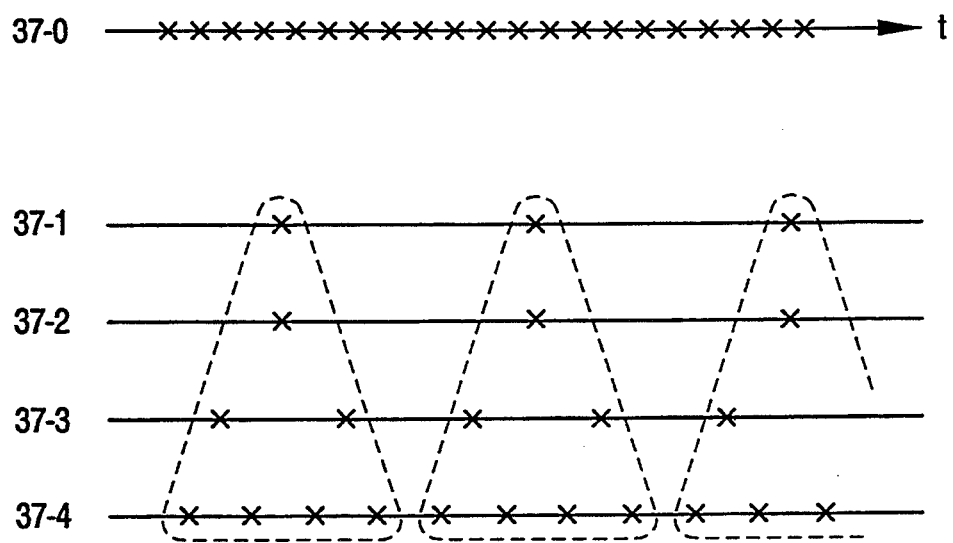
FIG. 8 schematically shows frequency bands which have hierarchical bandwidths and in which subband samples are derived from the one-dimensional input signal.

Turning to FIG. 8, the time axis is scaled differently from that used in FIG. 7. It is presumed that the original bandwidth is hierarchically divided into the first through the fourth frequency bands in the manner described in connection with FIG. 3. The converted samples are illustrated along a zeroth or top line labelled 37-0. The first through the fourth frequency bands are depicted at 37-1, 37-2, 37-3, and 37-4 along first through fourth lines drawn below the zeroth line.

Each sample group consists of only one classified sample in each of the first and the second frequency bands 37-1 and 37-2, two classified samples in the third frequency band 37-3, and four classified samples in the fourth frequency band 37-4. It is readily possible to make the first through the fourth downsampling circuits 31-1 to 31-4 (FIG. 6) to downsample the converted signal samples of the first through the fourth band-limited signals by mere adjustment of the downsampling instants. It should be noted that the classified samples of each sample group are in a common time region across the first through the fourth frequency bands 37.

Figure 9:
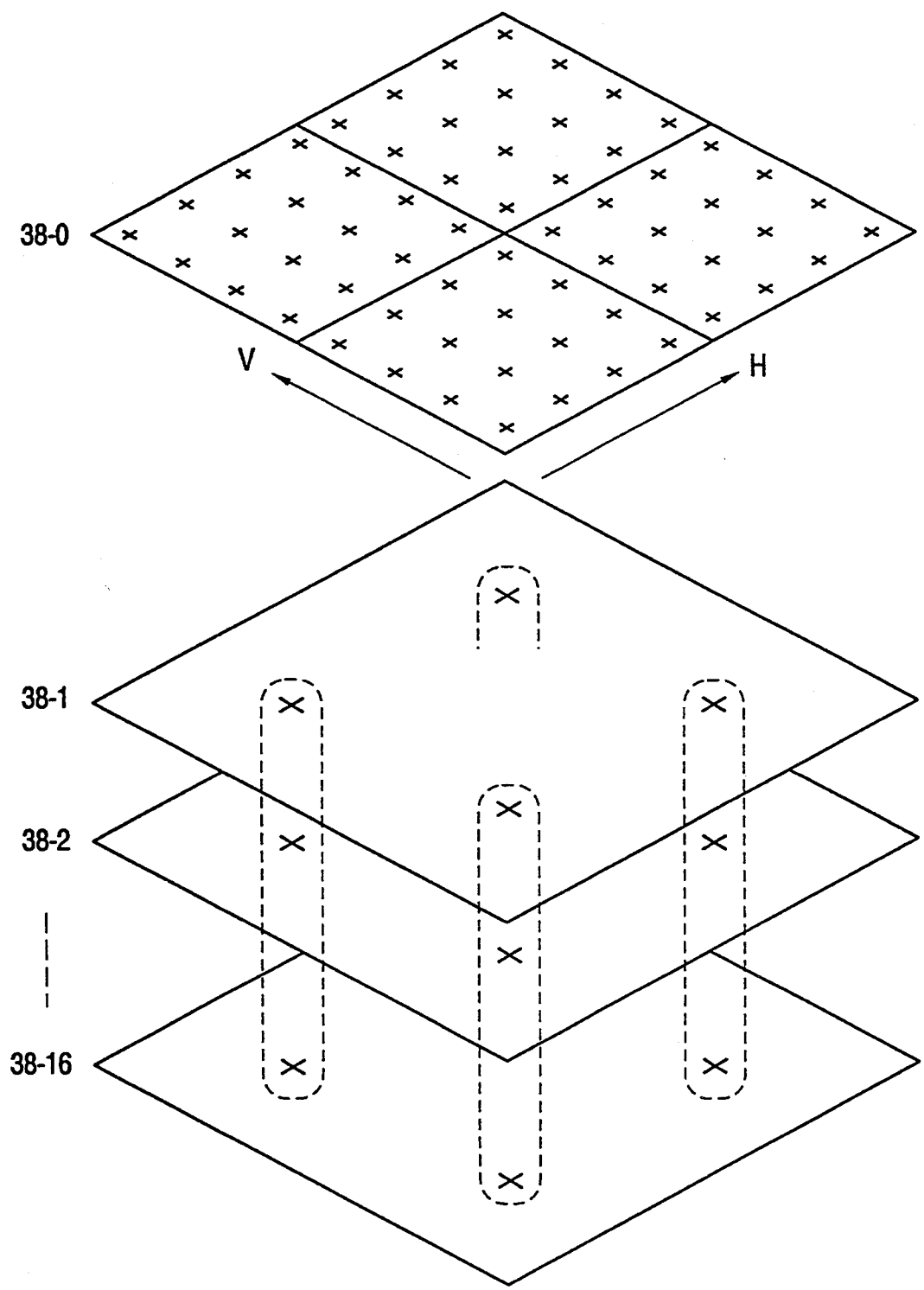
FIG. 9 schematically shows frequency bands which have a common bandwidth and in which subband samples are derived from a two-dimensional input signal.

Referring to FIG. 9, signal planes are perspectively illustrated with horizontal and vertical axes indicated at H and V. It will be presumed that the original bandwidth is equally divided into the first through the sixteenth bandwidths illustrated with reference to FIG. 4. The converted samples are depicted by crisscrosses on an original signal plane drawn along a zeroth or top row labelled 38-0. The first through the sixteenth frequency bands are illustrated at 38-1, 38-2, . . . and 38-16 along first through sixteenth rows below the zeroth row.

In each of the first through the sixteenth frequency bands 38 (suffixes 1 through 16 omitted), four classified samples are exemplified at four signal points which are represented by combinations of the downsampling instants, such as (0, 0)-th, (0, 1)-th, (1, 1)-th, and (1, 0)-th downsampling instants. In the manner enclosed with a dashed-line loop, the classified samples of each sample group are positioned at the signal points indicated by one of the combinations on each signal plane. Each sample group extends across the first through the sixteenth frequency bands 38. It should be noted that only three of such sample groups are depicted merely for simplicity of illustration.

Figure 10:
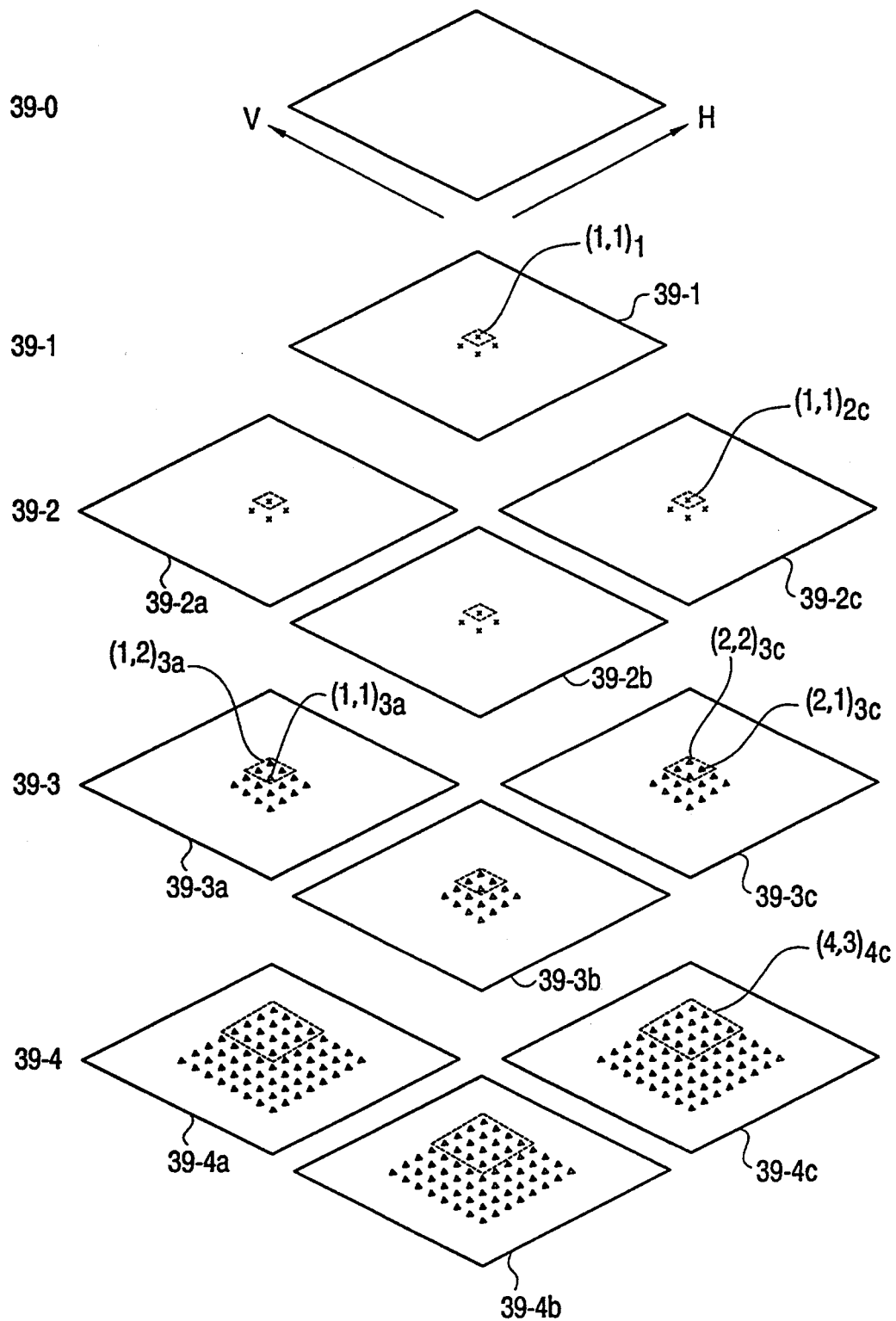
FIG. 10 schematically shows frequency bands which have hierarchical bandwidths and in which subband samples are derived from the two-dimensional input signal.

Turning to FIG. 10, it is presumed that the original bandwidth is hierarchically divided into first through tenth frequency bands described in conjunction with FIG. 5. On an original signal plane depicted along a zeroth or top row labelled 39-0, the converted samples are illustrated along horizontal and vertical axes H and V. The first frequency band is illustrated at 39-1 on a first signal plane which is perspectively depicted along a first row below the zeroth row. The second through the fourth or the second primary through the second tertiary frequency bands are illustrated at 39-2a through 39-2c along a second row on a common second signal plane which is again perspectively depicted below the first signal plane. The fifth through the seventh or the third primary through the third tertiary frequency bands are illustrated at 39-3a through 39-3c along a third row on a common third signal plane which is again perspectively depicted below the second signal plane. The eighth through the tenth or the fourth primary through the fourth tertiary frequency bands are illustrated at 39-4a through 39-4c along a fourth or bottom row on a common fourth signal plane which is further again perspectively depicted below the third signal plane.

In FIG. 10, the classified samples are surrounded by broken line. Only one classified sample of a sample group is depicted on the first frequency bond 39-1 and each of the second primary through the second tertiary frequency bands 39-2a to 39-2c. Four classified samples of the sample group under consideration are depicted in each of the third primary through the third tertiary frequency bands 39-3a to 39-3c. Sixteen classified samples of the sample group in question are depicted in each of the fourth primary through the fourth tertiary frequency bands 39-4a to 39-4c. The classified samples included in ten subbands correspond to the same region in original two-dimensional input signal.

Referring now to FIG. 11, it will again be presumed at first that the original bandwidth is equally divided into the first through the fourth bandwidths in the manner illustrated with reference to FIG. 2. The single coding circuit 34 comprises first through fourth buffers 41-1, 41-2, 41-3, and 41-4 connected to the first through the fourth downsampling circuits 31 and supplied with the downsampling signal through a connection which is not shown. Each of the first through the fourth buffers 41 (suffixes omitted) may be a first-in first-out buffer.

Under the circumstances, it is possible to understand in conjunction with FIG. 7 that the downsampling instants are divisible into a succession of downsampling period groups which are in one-to-one correspondence to the sample groups. First through fourth downsampling instants are included in each downsampling period group. The first buffer 41 is controlled by the downsampling signal at the first downsampling instant in each downsampling period group. Likewise, the second through the fourth buffers 41 are controlled by the downsampling signal at the second through the fourth downsampling instants in each downsampling period group.

The first through the fourth buffers 41 are therefore for producing the subband or the classified samples which are depicted in FIG. 7 along the first through the fourth frequency bands 36. A subband sample selector 42 is controlled by the downsampling signal. It is possible in this manner to make the selector 42 produce the classified samples of the sample groups in successive downsampling period groups.

It is now appreciated that a combination of the first through the fourth buffers 41 and the selector 42 serves as a classified sample scanner for scanning the classified samples of each sample group across the first through the fourth frequency bands 36. When the selector 42 is made to select in each downsampling period group the classified samples successively from the first buffer 41-1 to the fourth buffer 41-4, the scanner (41, 42) scans the first through the fourth frequency bands 36 in an ascending order. More particularly, the scanner scans the classified samples of each sample group in the manner indicated in FIG. 7 by line segments with arrowheads from that in the first frequency band 36-1 to that in the fourth frequency band 36-4 and subsequently to the classified samples of another sample group that next follows the sample group under consideration in the sequence of sample groups. Alternatively, the scanner may scan the frequency bands in a descending order from the fourth frequency band 36-4 to the first frequency band 36-1. In either event, the scanner produces a scanned sequence of scanned samples.

A single coder 43 is connected to the classified sample scanner (41, 42) to code the scanned sample sequence into the subband coded signal for delivery to the device output terminal 26. It should be noted in this connection that the coders 32 of the conventional subband encoding device are for coding the subband or the classified samples of the first through the fourth frequency bands individually according to the frequency bands. The subband samples, however, have an appreciable correlation between the frequency bands.

For example, attention will be directed to a picture signal. In this event, significant components are derived from each edge signal or a like discontinuous point and its adjacency where components of a wide frequency range congestedly or crowdedly appear, ranging between long and higher frequencies. In other words, the significant components appear with a common probability of a certain extent in the first through the fourth frequency bands 36. To the contrary, higher frequency components appears with a very small probability in other parts of the picture signal.

In view of the above, the single coder 43 is used in the subband coding device being illustrated in coding the scanned sample sequence preferably with the correlation between the frequency bands taken into consideration and in thereby carrying out a more effective band compression. Consequently, the coding section (34) so codes the first through the fourth subband sample sequences. Such a coder is known in the art. For example, the single coder 43 is selected from a vector quantizer, a predictive coder, and an adaptive coder. On using the adaptive coder, the scanned sample sequence is tested whether the scanned samples are active or non-zero samples or components or are not the active samples but zero samples or components.

Continuing reference to FIG. 11 with FIG. 8 additionally referred to, it will now be presumed that the original bandwidth is hierarchically divided into the first through the fourth bandwidths in the manner illustrated with reference to FIG. 3. Each downsampling period group consists of first through eighth downsampling instants. The first and the second buffers 41 are controlled by the downsampling signal at the fourth and the fifth downsampling instants with each of the first and the second buffers 41 once controlled in each downsampling period group. The third buffer 41-3 is twice controlled at the second and the seventh downsampling instants in each downsampling period group. The fourth buffer 41-4 is four times controlled at the first, the third, the sixth, and the eighth downsampling instants in each downsampling period group. In other respects, the single coding circuit 34 is not different from that described in conjunction with FIG. 11 with FIG. 7 taken into account.

Figure 11:
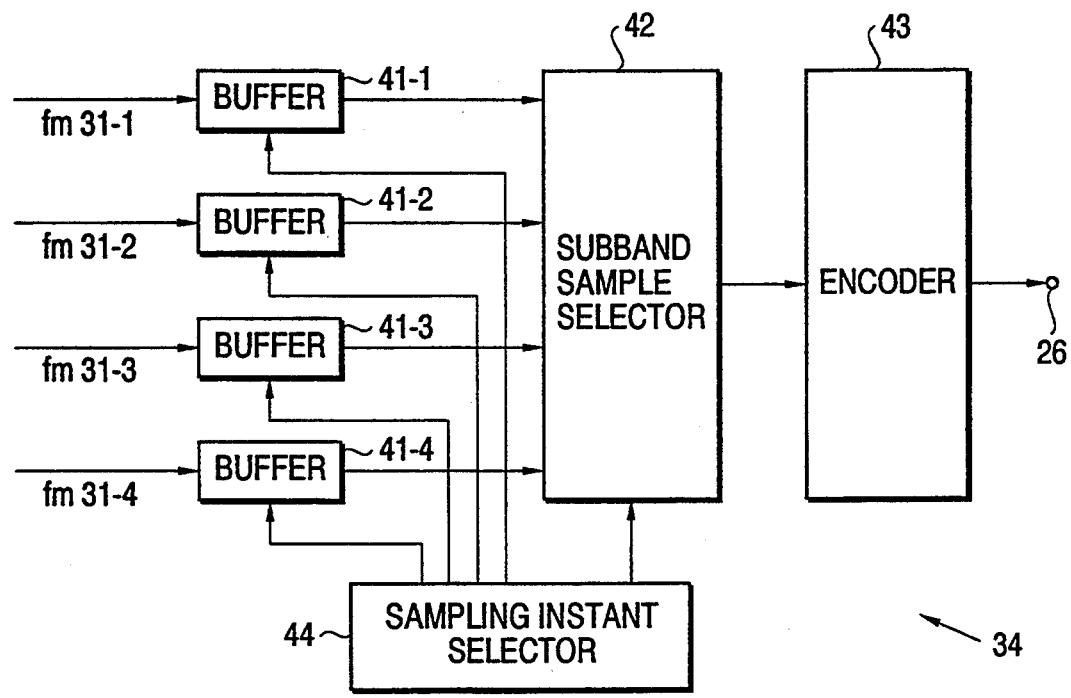
FIG. 11 is a block diagram of a coding circuit for use in the subband coding device illustrated in FIG. 6.

Referring to FIG. 11 with FIG. 9 additionally referred to, it will now be presumed that the original bandwidth is equally divided into the first through the sixteenth bandwidths in the manner illustrated with reference to FIG. 4. It will be observed in FIG. 9 along the zeroth row 38-0 that the downsampling instants are divided by a pair of orthogonally intersecting solid lines into four downsampling instant groups.

Leftmost along the horizontal axis H and rightmost along the vertical axis V, one of the four downsampling instant groups will be called a (1, 1)-th group and consists of the downsampling instants of a (1, 1)-th downsampling period group. Immediately succeeding the (1, 1)-th group forwardly along the horizontal axis H, another group will be called a (1, 2)-th group and consists of the downsampling instants of a (1, 2)-th downsampling period group. Next following the (1, 2)-th group backwardly along the vertical axis V, still another group will be called a (2, 2)-th group and consists of the downsampling instants of a (2, 2)-th downsampling period group. Immediately succeeded by the (2, 2)-th group forwardly along the horizontal axis H and consequently immediately succeeding the (1, 1)-th group backwardly along the vertical axis V, yet another group will be called a (2, 1)-th group and consists of the downsampling instants of a (2, 1)-th downsampling period group.

Beyond the (2, 1)-th downsampling period group, downsampling period groups are similarly called (1, 3)-th, (2, 3)-th, (3, 3)-th, (3, 2)-th, (3, 1)-th, and like downsampling period groups. In this manner, the downsampling instants are two-dimensionally divisible into a succession of downsampling period groups. In each downsampling period group, the downsampling instants are likewise called (1, 1)-th, (1, 2)-th, (2, 2)-th, (2, 1)-th, . . . (1, 4)-th, (2, 4)-th, (3, 4)-th, (4, 4)-th, (4, 3)-th, (4, 2)-th, and (4, 1)-th downsampling instants.

In FIG. 11, the buffers 41 are sixteen in number and are called first through sixteen buffers in correspondence to the first through the sixteenth signal planes depicted in FIG. 9 at 38. The first through the sixteen buffers may be controlled by the downsampling signal as follows in each downsampling period group. The first buffer is controlled at the (1, 1)-th downsampling instant. The second through the fourth buffers are controlled at the (1, 2)-th through the (2, 1)-th downsampling instants. The fifth through the ninth buffers are controlled at the (1, 3)-th through the (3, 1)-th downsampling instants. The tenth through the sixteenth buffers are controlled at the (1, 4)-th through the (4, 1)-th downsampling instants.

The subband sample selector 42 selects the classified samples of the sample groups by the downsampling signal successively in correspondence to the (1, 1)-th, the (1, 2)-th through the (2, 1)-th, and like downsampling period groups. In other respects, the single encoding circuit 34 is not different from that described with reference to FIG. 11 with FIG. 7 or 8 additionally referred to.

Reference to FIG. 11 will be continued with FIG. 10 additionally referred to. The original bandwidth is divided hierarchically into the first through the tenth bandwidths in the manner illustrated with reference to FIG. 5. The downsampling instants are again divisible into a succession of downsampling period groups two-dimensionally.

FIG. 10 will first be observed with attention directed to the description made above with reference to FIG. 11. Now assumed that a downsampled signal which is located at (H, V) in X band is denoted by $(H, V)_x$. For example, a sample of the first band is denoted by $(1, 1)_1$ and samples in the seventh band ($39$-$3c$) are $(H, V)_{3c}$ wherein H=1, 2, 3, 4 and V=1, 2, 3, 4.

In FIG. 11, the buffers 41 are ten in number and are called first through tenth buffers in correspondence to the first through the tenth frequency bands depicted in FIG. 10. The first through the tenth buffers may be controlled by the downsampling signal as follows.

Each of the first and the second through the fourth buffers is controlled once in each downsampling period group. The first and the second through the fourth buffers are controlled at the $(1, 1)_1$-th and the $(1, 1)_{2a}$-th through the $(1, 1)_{2c}$-th downsampling instants. Each of the fifth through the seventh buffers is controlled four times in each downsampling period group. The fifth buffer is controlled at the $(1, 1)_{3a}$-th, $(1, 2)_{3a}$-th, $(2, 1)_{3a}$-th, and $(2, 2)_{3a}$-th downsampling instants. The sixth buffer is controlled at the $(1, 1)_{3b}$-th, $(1, 2)_{3b}$-th, $(2, 1)_{3b}$-th, and $(2, 2)$ $_{3b}$-th downsampling instants. The seventh buffer is controlled at the $(1, 1)$ $_{3c}$-th, $(1, 2)$ $_{3c}$-th, $(2, 1)$ $_{3c}$-th, and $(2, 2)_{3c}$-th downsampling instants. Each of the eighth through the tenth buffers is controlled sixteen times in each downsampling period group. The eighth buffer is controlled at the $(1, 1)_{4a}$-th through $(1, 4)_{4a}$-th, $(2, 1)_{4a}$-th through $(2, 4)_{4a}$-th, $(3, 1)_{4a}$-th through $(3, 4)$ $_{4a}$-th, and $(4, 1)$ $_{4a}$-th through $(4, 4)$ $_{4a}$-th downsampling instants. The ninth buffer is controlled at $(1, 1)_{4b}$-th through $(1, 4)_{4b}$-th, $(2, 1)_{4b}$-th through $(2, 4)_{4b}$-th, $(3, 1)_{4b}$-th through $(3, 4)_{4b}$-th, and $(4, 1)_{4b}$-th through $(4, 4)_{4b}$-th downsampling instants. The tenth buffer is controlled at the $(1, 1)_{4c}$-th through $(1, 4)_{4c}$-th, $(2, 1)_{4c}$-th through $(2, 4)_{4c}$-th, $(3, 1)_{4c}$-th through $(3, 4)_{4c}$-th, and $(4, 1)_{4c}$-th through $(4, 4)_{4c}$-th downsampling instants.

The subband sample selector 42 successively selects the sample groups of the classified samples in the downsampling period groups in the manner described with FIG. 9 additionally referred to. In other respects, the encoding circuit 34 is not different from that described in the foregoing.

Figure 12A:
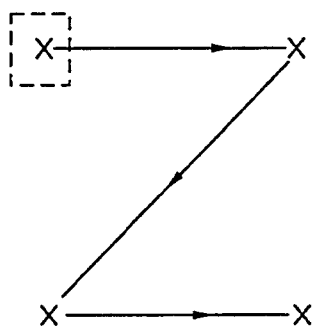
FIGS. 12a to 12c schematically show subband samples which are derived from a two-dimensional input signal and are coded by the coding circuit depicted in FIG. 11.
Figure 12B:
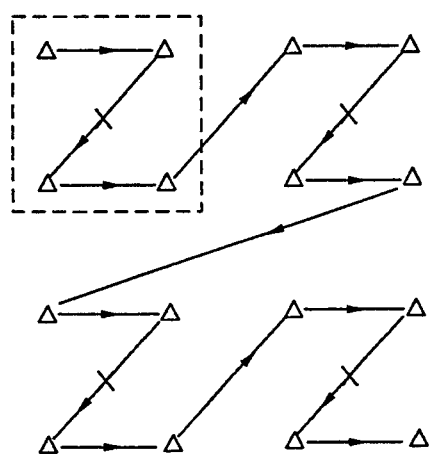
Figure 12C:
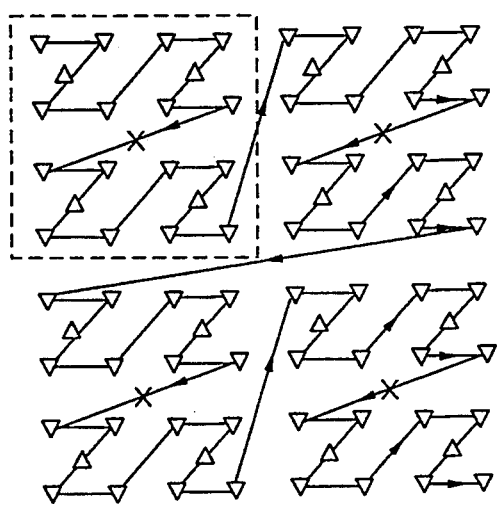

Turning to FIGS. 12a to 12c with reference to FIG. 11 continued, the buffers 41 are controlled preferably as follows rather than in the manner exemplified above merely for convenience of the description. When downsampled at an n-th downsampling instant, a subband sample will be called an n-th sample.

By the downsampling signal, the first through the tenth buffers 41 are first controlled in the first through tenth subband groups.

FIGS. 12a to 12c show scanning order of classified samples between adjacent subband coded sample groups in first through fourth subband groups, fifth through seventh subband groups, eighth through tenth subband groups, respectively. In FIGS. 12a to 12c, areas which are surrounded by broken line correspond to the areas depicted in FIG. 10. Scanning order of classified samples between different subband bandwidth will be described later.

FIGS. 11 and 12 will be reviewed. On keeping the coding circuit 34 in operation in the manner described with additional reference to FIG. 8, 9, or 10, it is convenient to use a sampling instant selector 44 in storing the classified samples in the buffers 41 as described above. Supplied with the downsampling signal through a connection which is not depicted, the sampling instant selector 44 selects the downsampling instants for control of the buffers 41 in the downsampling period groups. Such a sampling instant selector 44 may be used even when the encoding circuit 34 is put in operation in the manner described with FIG. 7 additionally referred to.

Figure 13:
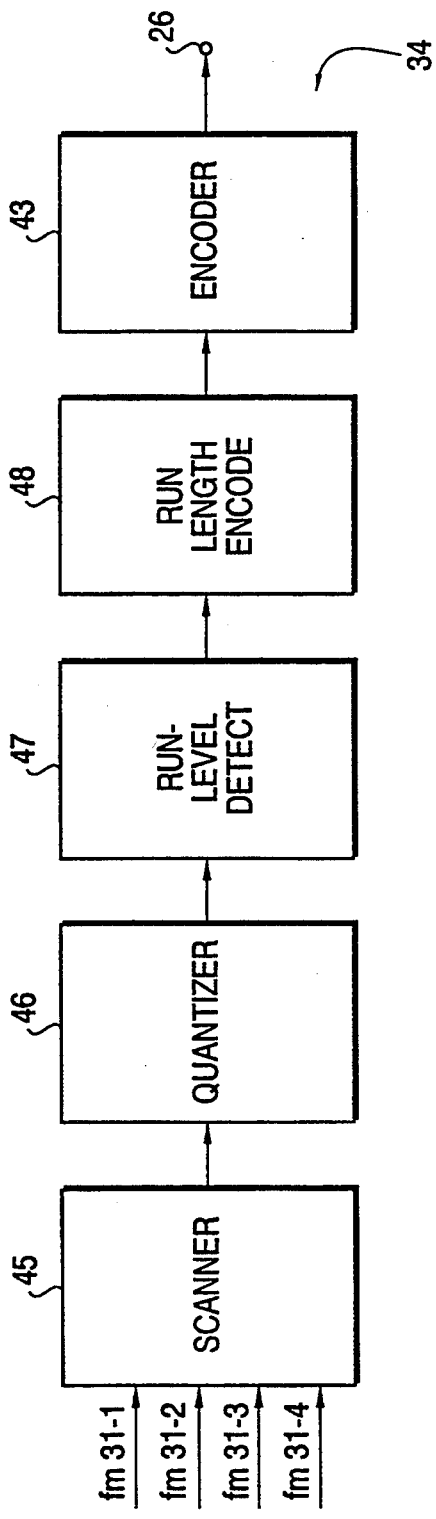
FIG. 13 is a block diagram of a coding circuit for use in a subband coding device according to a second embodiment of this invention.

Referring now to FIG. 13 with FIGS. 6 and 11 additionally referred to, a coding circuit is designated by the reference numeral 34 for use in a subband coding device according to a second embodiment of this invention. Except for the coding circuit 34 being illustrated, the subband coding device is not different from that illustrated with reference to FIG. 6. It will again be assumed that the predetermined natural number N is equal to four.

In FIG. 13, a subband sample scanner 45 is connected to the first through the fourth downsampling circuits 31 to scan the first through the fourth sequences of subband samples into a one-dimensional output signal and to produce the one-dimensional output signal as a scanned output signal. The scanner 45 is a combination of the buffer 41 and the subband sample selector 42, all of which are described in conjunction with FIG. 11. The scanner output signal is therefore the scanned sample sequence described above. The scanner 45 is controlled by the downsampling signal either directly or through the sampling instant selector 44 which is not herein depicted merely for simplicity of the illustration.

A quantizer 46 is connected to the subband sample scanner 45 to quantize the scanned samples of the sequence into quantized components of a sequence. The quantized components are supplied directly to the single encoder 43 and coded into the subband coded signal for supply to the device output terminal 26. It will be observed in FIG. 13 that a run-level detector 47 and a run length coder 48 are interposed between the quantizer 46 and the single encoder 43. The run-level detector 47 and the run length coder 48 will presently be described.

In the manner described before, the higher frequency components are not significant components in a part of the device input signal that is other that a discontinuous point, such as an edge signal, and its adjacency. The quantized components have a zero level in each of such parts of the device input signal. Preferably, these quantized components should be subjected to the run length coding known in the art and may be called run components. Other quantized components have non-zero or significant levels and may be called level components.

The run-level detector 47 is therefore connected to the quantizer 46 to classify the quantized components into two parts, that is, into the run components and the level components. Connected to the run-level detector 47, the run length coder 48 codes the run components into run length codes, which are delivered to the single encoder 43. It should be noted that the run length coder 48 delivers the level components directly to the coder 43 as they stand. The coder 43 codes the level components and the run length codes collectively into the subband coded signal for supply to the device output terminal 26. Under the circumstances, the subband coded signal is typically represented by the Huffman codes.

Reviewing FIG. 13, it should be noted that the coding section (34) comprises the quantizer 46. The subband samples are therefore made to represent quantized values. In this event, the coding section is for coding the subband samples with attention directed to correlation between the quantized values of each pair of the first through the fourth frequency bands.

It should additionally be noted that the coding section includes the run-level detector 47 and the run length coder 48. The coding section is therefore for coding each succession of run or zero-level components of the subband samples into a run length code and for inserting such run length codes in the subband coded signal.

Figure 14:
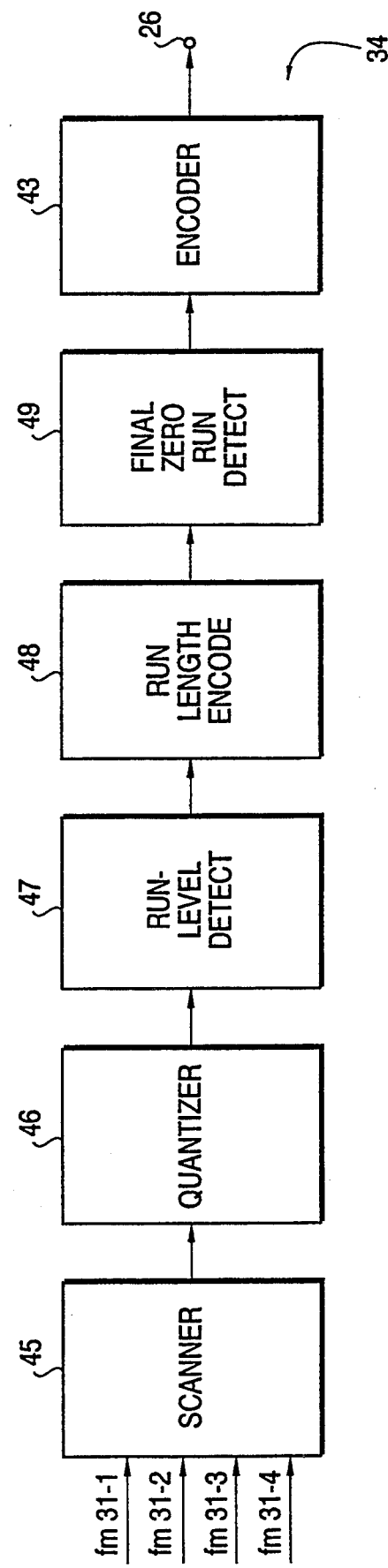
FIG. 14 is a block diagram of a coding circuit for use in a subband coding device according to a third embodiment of this invention.

Referring to FIG. 14 with FIGS. 6, 11, and 13 additionally referred to, a coding circuit is designated again by the reference numeral 34 for use in a subband coding device according to a third embodiment of this invention. Except for the coding circuit 34 being illustrated, the subband coding device is not different from that illustrated with reference to FIG. 6. It is assumed that the predetermined natural number is equal to four and that the original bandwidth is hierarchically divided into the first through the fourth frequency bands in the manner illustrated with reference to FIG. 3.

As in FIG. 13, the subband sample scanner 45 is connected to the first through the fourth downsampling circuits 31 to produce the subband sample sequence. Through the run-level detector 47, the run length encoder 48 is connected to the quantizer 46. In the manner described above and will shortly be exemplified, the run components frequently appear in the higher frequencies. This applies equally well when the original bandwidth is hierarchically divided as illustrated with reference to FIG. 3.

It will first be surmised that the classified samples of each sample group are scanned in the ascending order from that of the first frequency band to those of the fourth frequency band. In this event, the run components may continuously appear at the end of scan of the subband sample of each sample group. It is therefore possible to further raise the efficiency of band compression by substituting an end of scan code for the run length code that appears at the end of scan of the subband samples of each sample group. The end of scan code is equivalent to an end of subtree (EOST) code which will shortly be described.

A final zero run detector 49 is therefore connected between the run length coder 48 and the single coder 43. Supplied with the downsampling signal through a connection which is not shown, the final zero run detector 49 detects the end of scan of the subband samples of each sample group. When a run length code appears at the end of scan of the subband samples of one of the sample groups, the final zero run detector 49 supplies the end of scan code to the single coder 43. Otherwise, the final zero run detector 49 supplies the single coder 43 with the level components and the run length codes. Such end of scan codes, the level components, and the run length codes are coded by the coder 43 into the subband coded signal like in the coding circuit 34 described with reference to FIG. 13.

It will next be surmised that the classified samples of each sample group are scanned in the descending order from the fourth frequency band to the first frequency band. In this even, it is possible to modify the illustrated encoding circuit 34 into a modification by changing the final zero-run detector 49 to an initial zero-run detector. It should be understood that the initial zero-run detector is depicted at 49. A start of scan code is used like a start of subtree (SOST) code which will shortly be described.

The foregoing description will be reviewed. In the manner described before, the original bandwidth is either equally or hierarchically divided into different frequency bands which consist in general of the first through the N-th frequency bands having a lowest through a highest frequency band. The coding section (34) is for coding the subband samples of each of the sample groups in an ascending order of the frequency bands, starting at the first frequency band and ending at the N-th frequency band. Alternatively, the coding section is for coding the subband samples of each sample group in a descending order, starting at the N-th frequency band and ending at the first frequency band. In this connection, it should be noted that the ascending or the descending order need not be strictly kept on coding the subband samples of each sample group. More particularly, the "ascending" order may proceed from the first frequency band to the N-th frequency band, partly in a descending order from the N-th frequency band to, for example, the (N−1)-th frequency band, and then forwardly to the N-th frequency band. The coding section is therefore for coding the subband samples of each of the sample groups either in a generally ascending order or in a generally descending order.

As for FIG. 14 wherein the ascending order is used, the coding section (34) is for coding each succession of the zero-level components into the end of scan code when the succession under consideration appears when scan of all of the subband samples of a sample group comes to an end. Furthermore, the coding section is for placing the end of scan code in the subband coded signal and for stopping the scan of the subband samples as soon as the succession appears.

Figure 15:
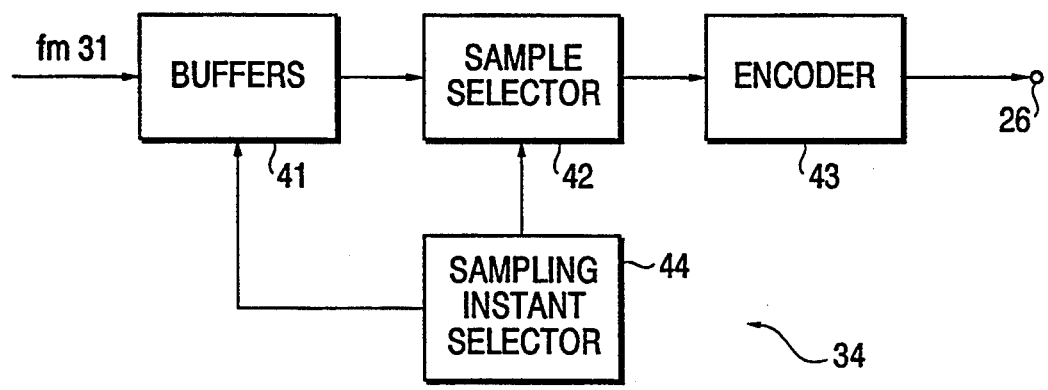
FIG. 15 is a block diagram of a coding circuit for use in a subband coding device according to a fourth embodiment of this invention.

Referring to FIG. 15 with FIGS. 6 and 11 continuously referred to, a coding circuit is depicted again at 34 for use in a subband coding device according to a fourth embodiment of this invention. Except for the coding circuit 34 being illustrated, the coding device is not different from that illustrated with reference to FIG. 6. It will be presumed that the subband samples are classified into the classified samples of each sample group in the manner described with reference to FIG. 8.

If the subband sample scanner 45 is used to scan the classified samples of each sample group in the manner described in connection with FIGS. 8 and 11, the classified samples of the fourth frequency band are scanned starting at the first downsampling instant of each downsampling period group immediately following a scan which ends at the seventh downsampling instant of the downsampling period group under consideration through the classified samples of the third frequency band. In this manner, the scan must be repeated along the third and the fourth frequency bands with an undesiredly long time difference of as many as six downsampling intervals or periods left between the scan along the third frequency band and that along the fourth frequency band.

Figure 16:
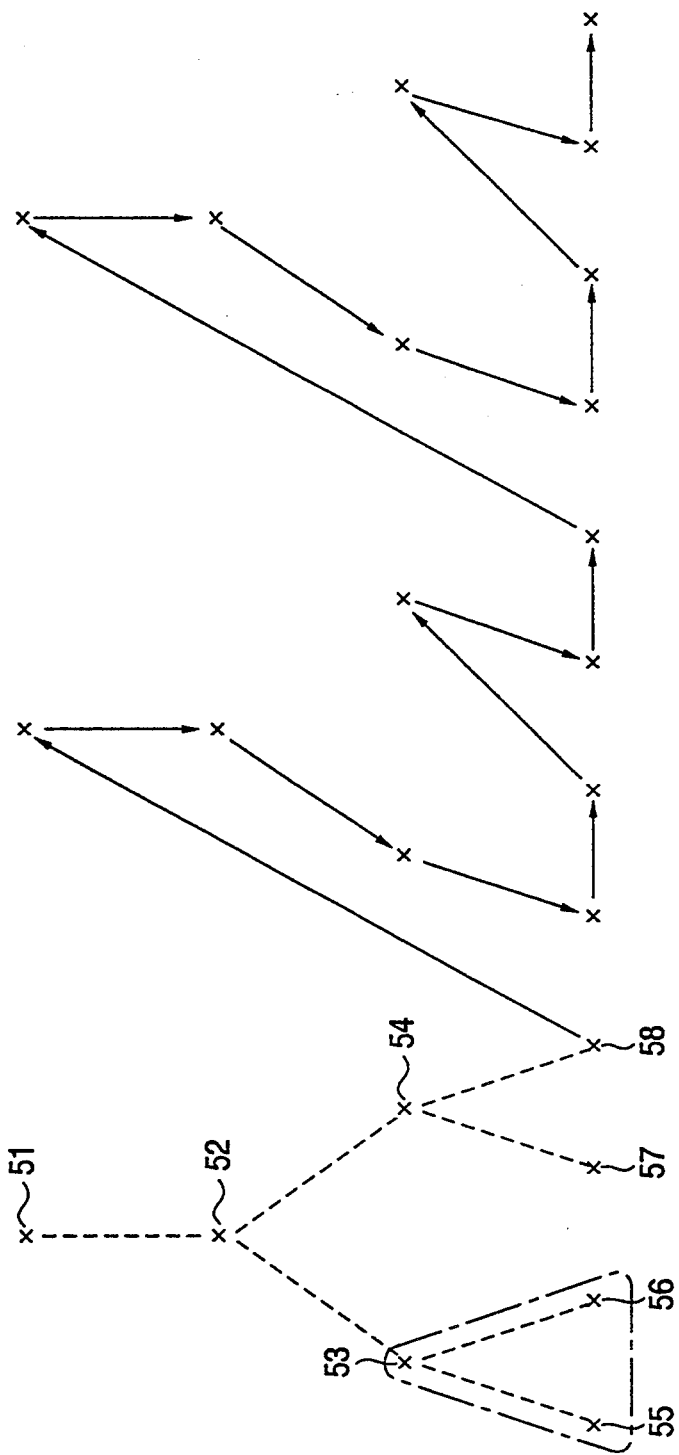
FIG. 16 schematically exemplifies tree structures which are for use in describing operation of the coding circuit shown in FIG. 15 and each of which includes subtrees.

Turning to FIG. 16 during a short while, it will be presumed that the classified samples are selected in the manner illustrated with reference to FIG. 8. The classified samples of each sample group are now arranged to form tree structures of a sequence. Leftmost in the figure, the tree structure is visualized by dashed lines and consists of first through eighth samples 51 to 58. It will be assumed that the classified samples of each sample group are scanned from the first sample 51 to the eighth sample 58 in the ascending order of the frequency bands.

It should be noted in connection with this manner of scan from the fourth sample 54 to the fifth sample 55 that the fourth and the fifth samples 54 and 55 are appreciably distant along the time axis. Such a distance becomes objectionably long when the samples, such as 54 and 55, are in two of greater numbered frequency bands.

In the example being illustrated, the tree structure of the classified samples of each sample group comprises two subtrees, one of which is enclosed with a loop depicted by a dashed line and consists of the third sample and the fifth and the sixth samples 53, 55, and 56. Such classified samples of the subtrees will be called subtree samples of a first and a second subtree.

The classified samples of each sample group or of each tree structure are scanned starting at the first sample 51 and proceeding to the second sample 52, to the subtree samples 53, 55, and 56, of the first subtree, and then to the subtree samples 54, 57, and 58 of the second subtree. Subsequently, the scan proceeds to the first sample in another sample group that immediately follows as another tree structure the sample group is question in the sample group sequence or in the tree structure sequence.

Such a scan is indicated by solid-line segments with arrowheads and makes it possible to subband code the device input signal in a shorter coding time. Although the first and the second samples 51 and 52 are not included in the subtrees, this scan will be called a subtree scan.

The subtree scan will be described more in general. It will be presumed that the original bandwidth is hierarchically divided into first through N-th frequency bands in the manner exemplified in FIG. 3, where N represents the predetermined natural number described by turning back to FIG. 1.

Merely for convenience of the description which follows, the first through the N-th frequency bands will be indicated by a frequency band number n which is variable from zero to (N−1) to represent the first through the N-th frequency bands. In an n-th frequency band, the classified samples will be identified by an in-band sample number k(n) which represents zero and positive integers. For example, the first sample 51 is identified by the in-band sample number 0(0). The second sample 52 is given the in-band sample number 0(1). The third and the fourth samples 53 and 54 have the in-band sample numbers 0(2) and 1(2). The fifth through the eighth samples 55 to 58 are specified by the in-band sample numbers 0(3) to 3(3). When rearranged into a one-dimensional fashion, the classified samples of the first through the N-th frequency bands are identified by a one-dimensional sample number i which is determined as follows.

(A.0). For the frequency band 0, namely for the first frequency band:

$$i = k(0) \times 2^{(N-1)};$$

(A.1). For the frequency band 1:

$$i = k(1) \times 2^{(N-1)} + ;$$

(A.2). For the frequency band 2:

$$i = k(2) \times 2^{(N-2)} + 2 - \text{mod}(k(2), 2)$$

(A.3). For the frequency band 3:

$$i = k(3) \times 2^{(N-3)} + 3 - \text{mod}(k(3), 2) \\ - \text{mod}(k(3)/2, 2);$$

(A.4). For the frequency band 4:

$$i = k(3) \times 2^{(N-3)} + 4 - \text{mod}(k(4), 2) \\ - \text{mod}(k(4)/2, 2) \\ - \text{mod}(k(4)/4, 2);$$

(A.5). For the frequency bands 5 and so forth, the one-dimensional sample number i is determined in a similar manner.

Figure 17A:
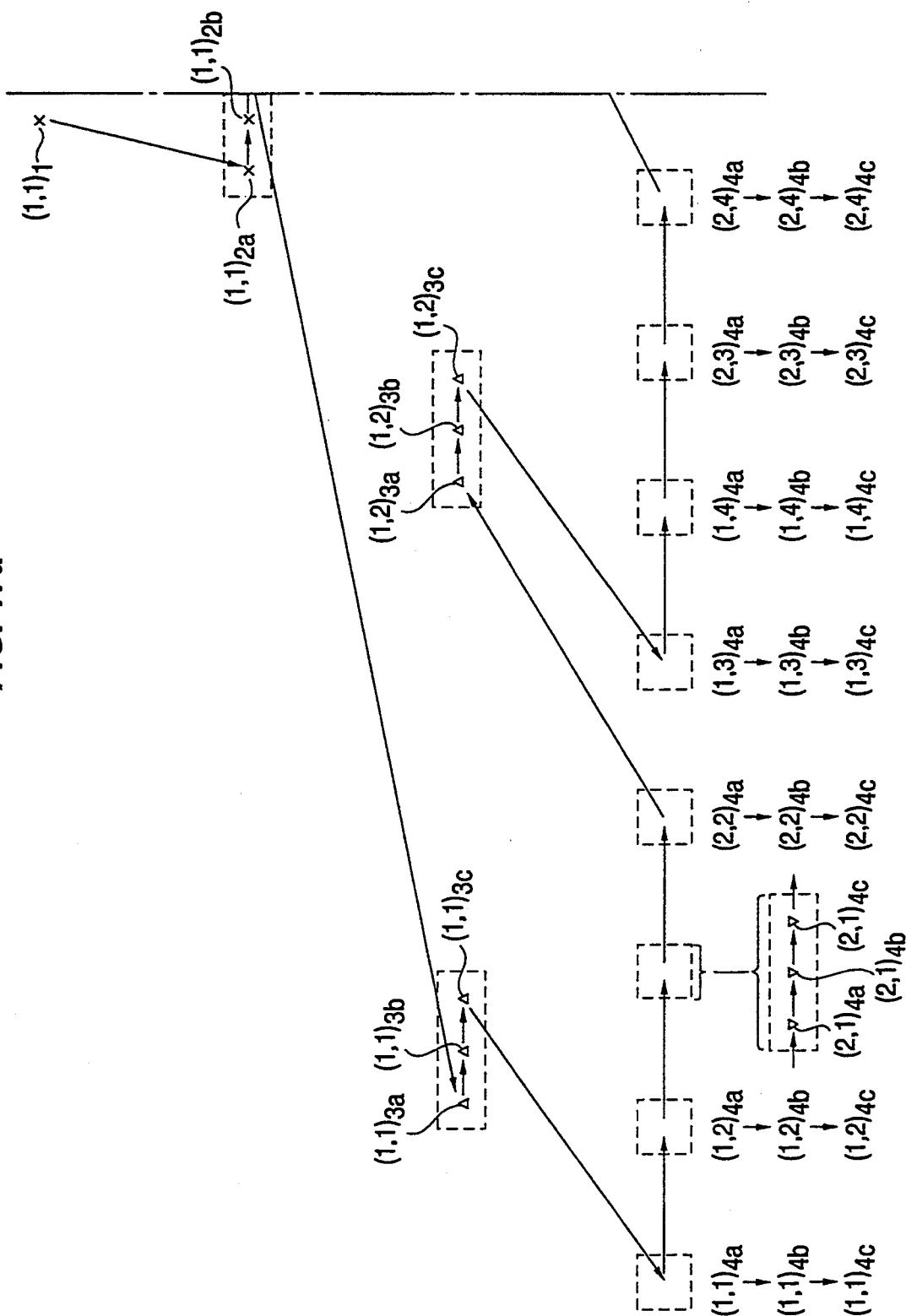
FIGS. 17 (a) and (b) schematically show different tree structures which include subtrees and are for use in describing operation of the coding circuit depicted in FIG. 15.
Figure 17B:
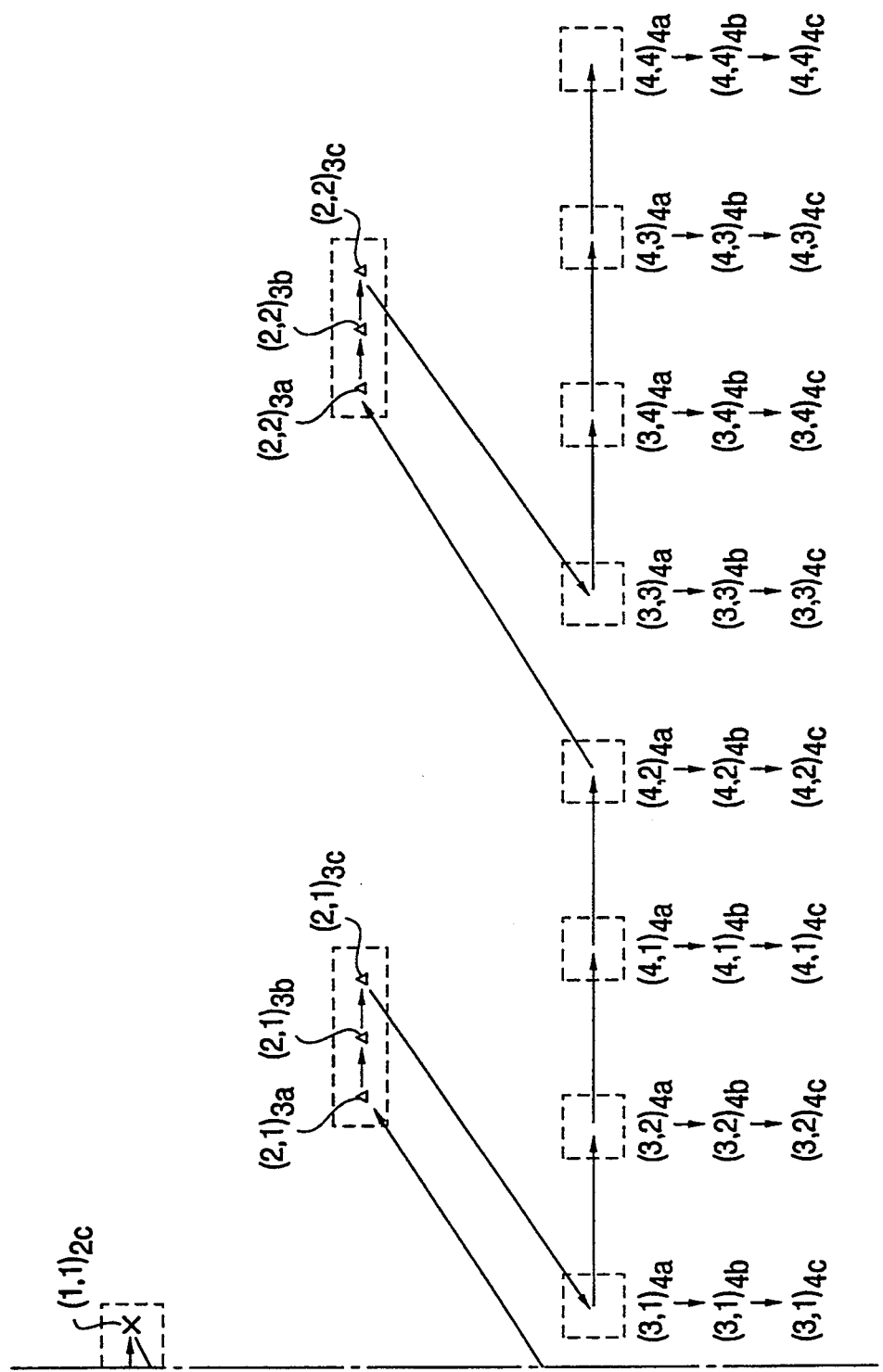

Further turning to FIGS. 17a and 17b, the classified samples of the sample groups are now selected in the manner illustrated with reference to FIG. 10. It will be assumed that the classified samples of each sample group are scanned in the generally ascending order with the descending order partly used in the manner described in conjunction with FIG. 16.

In order to form a sequence of tree structures which can one-dimensionally be scanned, the classified samples of each sample group are subgrouped into first through fourth subgroups in consideration of their positions on the first through the fourth signal planes. The classified samples of each subgroup are indicated by the same character as FIG. 10. Each of the second through the fourth subgroups is indicated by a dashedline rectangle. More particularly, the first subgroup consists of only one classified sample of the first frequency band.

As for the second and the following subgroups, FIG. 5 will additionally be referred to. The second subgroup consists of the classified samples $(1, 1)_{2a}$ to $(1, 1)_{2c}$. The classified samples $(1, 1)_{3a}$ to $(2, 2)_{3c}$ of a third primary subgroup consists of one of the four classified samples of the (3a)-th frequency band and two correspondingly positioned classified samples of the (3b)-th and the (3c)-th frequency bands. A third secondary subgroup consists of three correspondingly positioned classified samples of the (3a)-th through the (3c)-th frequency bands. In this manner, each of third tertiary and quarternary subgroups consists of three correspondingly positioned classified samples of the (3a)-th through the (3c)-th frequency bands.

In a like manner, a fourth primary subgroup consists of three correspondingly positioned classified samples $(1, 1)_{4a}$ to $(4, 4)_{4c}$ of the (4a)-th through the (4c)-th frequency bands in the manner depicted in detail in connection with a fourth tertiary subgroup. In this manner, a fourth 16′ary subgroup consists of three correspondingly positioned ones of the classified samples of the (4a)-th through the (4c)-th frequency bands.

In the manner indicated by line segments with arrowheads, the subtree scan starts at the classified sample of the first subgroup and proceeds to the classified samples of the (2a)-th through the (2c)-th frequency bands in the second subgroup, namely, $(1, 1)_{2a}$ to $(1, 1)_{2c}$, to the classified samples of the (3a)-th through the (3c)-th frequency bands in the third primary subgroup, to the classified samples of the (4a)-th through the (4c)-th frequency bands in the fourth primary subgroup, . . . , to the classified samples of the (4a)-th through the (4c)-th frequency bands in the fourth quarternary subgroup, to the classified samples of the (3a)-th through the (3c)-th frequency bands in the third secondary subgroup, to the classified samples of the (4a)-th through the (4c)-th frequency bands in the fourth quinary subgroup, and so on.

The subtree scan will be described more in general. For this purpose, let the original bandwidth be hierarchically divided into first, (2a)-th through (2c)-th, (3a)-th through (3c)-th, . . . , and (Na)-th through (Nc)-th frequency bands, where N represents the predetermined natural number. Such a frequency band will be indicated by a combination of first and second frequency band numbers n and m, where n is variable from zero to (N−1), m being equal to zero if the first frequency number n is equal to zero. Otherwise, m is variable from zero to two, both inclusive. In an (nm)-th frequency band, the classified samples will be identified by an in-band sample number k(nm) which represents zero and positive integers. For example, the classified sample of the (3a)-th frequency band in the third primary subgroup is identified by the in-band sample number 0(20). The classified sample of the (3b)-th frequency band in the third secondary subgroup is represented by the in-band sample number 4(21). The classified sample of the (4b)-th frequency band and the (4c)-th frequency band in the fourth tertiary subgroup are given the in-band sample numbers 7(31) and 8(32). When rearranged into a one-dimensional style, the classified samples of the first through the (Nc)-th frequency bands are specified by a one-dimensional sample number i, which is determined as follows.

(B.0). For the frequency band 0, namely, for the first frequency band:

$$i = k(00) \times 2^{2N-1};$$

(B.1). For the frequency bands 1, namely for the (2a)-th through the (2c)-th frequency bands:

$$i = k(10) \times 2^{2N-1} + 1 + m;$$

(B.2). For the frequency bands 2, namely, for the (3a)-th through the (3c)-th frequency bands;

$$i = k(20) \times 2^{2(N-2)} + 7 + m - \mathrm{mod}(k(20), 2^2);$$

(B.3). For the frequency bands 3:

$$i = k(30) \times 2^{2(N-3)} + 7 + m - \mathrm{mod}(k(30), 2^2) - \mathrm{mod}(k(30)/2^2, 2^2);$$

(B.4). For the frequency bands 4:

$$i = k(40) \times 2^{2(N-4)} + 10 + m - \mathrm{mod}(k(40), 2^2) - \mathrm{mod}(k(40)/2^4, 2^2) - \mathrm{mod}(k(40)/2^5, 2^2);$$

(B.5). For the frequency bands 5 and so forth, the one-dimensional sample number i is determined in a like manner.

Turning back to FIG. 15, the coding circuit 34 comprises similar parts which are designated by like reference numerals and are similarly operable with likewise named signals. It should be noted that the sampling instant selector 44 is connected to the buffers 41 and the subband sample selector 42. Supplied with the downsampling signal through a connection not depicted, the sampling instant selector 44 supplies a rearranged sampling signal to the buffers 41 and the subband sample selector 42. In the rearranged sampling signal, the downsampling instants are successively indicated in accordance with the right-hand sides of equations given above in items (A.0) through (A.5) when the original bandwidth is hierarchically divided into the first through the N-th frequency bands in the manner illustrated with reference to FIG. 3. When the original bandwidth is hierarchically divided into the first through the (Nc)-th frequency bands, the downsampling instants are successively specified in accordance with the right-hand sides of equations given in items (B.0) through (B.5).

Reviewing FIGS. 15 through 17, it is now appreciated that the illustrated coding circuit 34 codes the subband samples of the sample groups into the subband coded signal with the subband samples subjected to the subtree scan even when the device input signal is whichever of the one-dimensional and the two-dimensional input signals. It should be noted in connection with FIG. 15 that the coding circuit 34 may comprise either a combination of the quantizer 46, the run-level detector 47, and the run length coder 48 described in conjunction with FIG. 13 or another combination of the quantizer 46, the run-level detector 47, the run length coder 48, and the final or the initial zero-run detector 49 which are described in connection with FIG. 14. In either event, the run-level detector 47 should be controlled by the rearranged sampling signal.

In addition, it is understood when the generally ascending order of scan is used that the subband sample of each group, such as the first through the eighth samples 51 to 58, are scanned starting at the first sample 51 in the first frequency band, proceeding forwardly to the fifth and the sixth samples 55 and 56 in the fourth frequency band, proceeding temporarily backwardly to the fourth sample 54 in the third frequency band, proceeding forwardly to the seventh sample 57, and ending at the eighth sample 58 in the fourth frequency band. Each tree structure includes at least one sample, such as the first sample 51, that is other than the subband samples of the subtrees. The coding section (34) is for coding the subband samples of each tree structure by scanning the subband samples of the tree structure starting at the above-mentioned at least one sample in the first frequency band and proceeding to the subband samples of the subtrees and ending at the subband sample which is a last one of the subtree samples and in the N-th frequency band.

Figure 18:
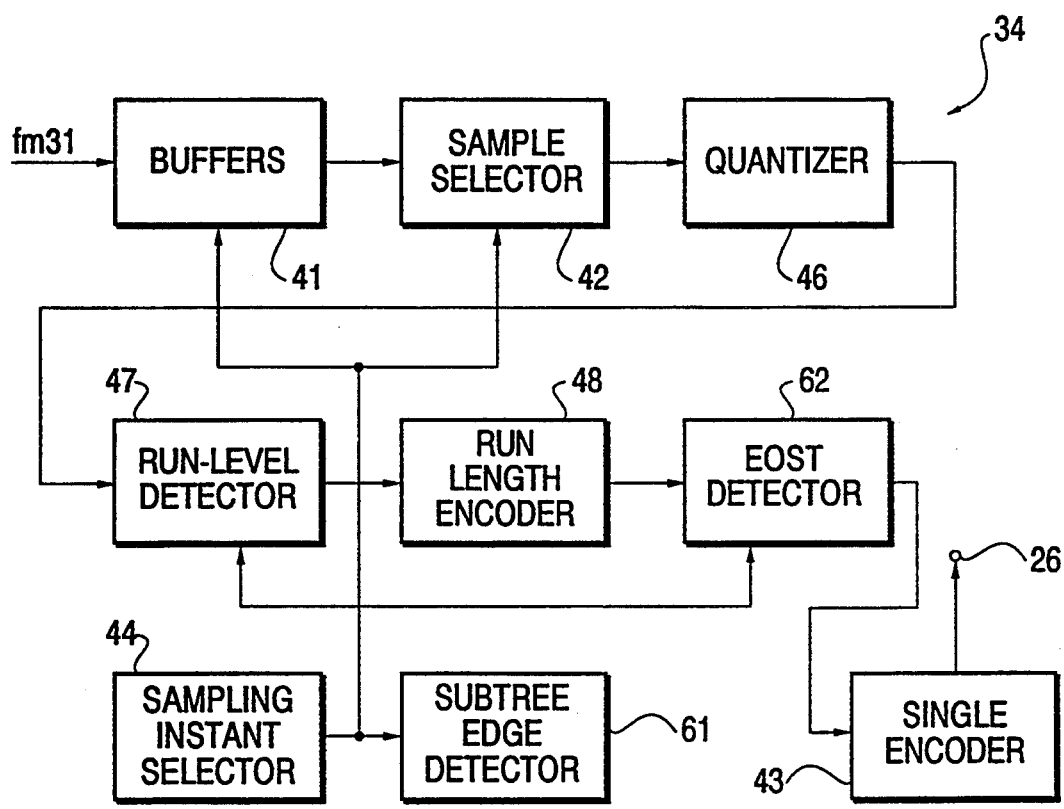
FIG. 18 is a block diagram of a coding circuit for use in a subband coding device according to a fifth embodiment of this invention.

Referring now to FIG. 18 with FIGS. 6 and 11 additionally referred to, a coding circuit is indicated again at 34 for use in a subband coding device according to a fifth embodiment of this invention. Except for the coding circuit 34 being illustrated, the subband coding device is not different from that illustrated with reference to FIG. 6. It is again presumed that the subband samples are classified into the classified samples in the manner described in conjunction with either with FIG. 8 or FIG. 10. In addition, it is surmised that the classified samples of each sample group are scanned generally in the ascending order of the first through the fourth frequency bands in the manner described in connection with FIG. 16.

Figure 19:
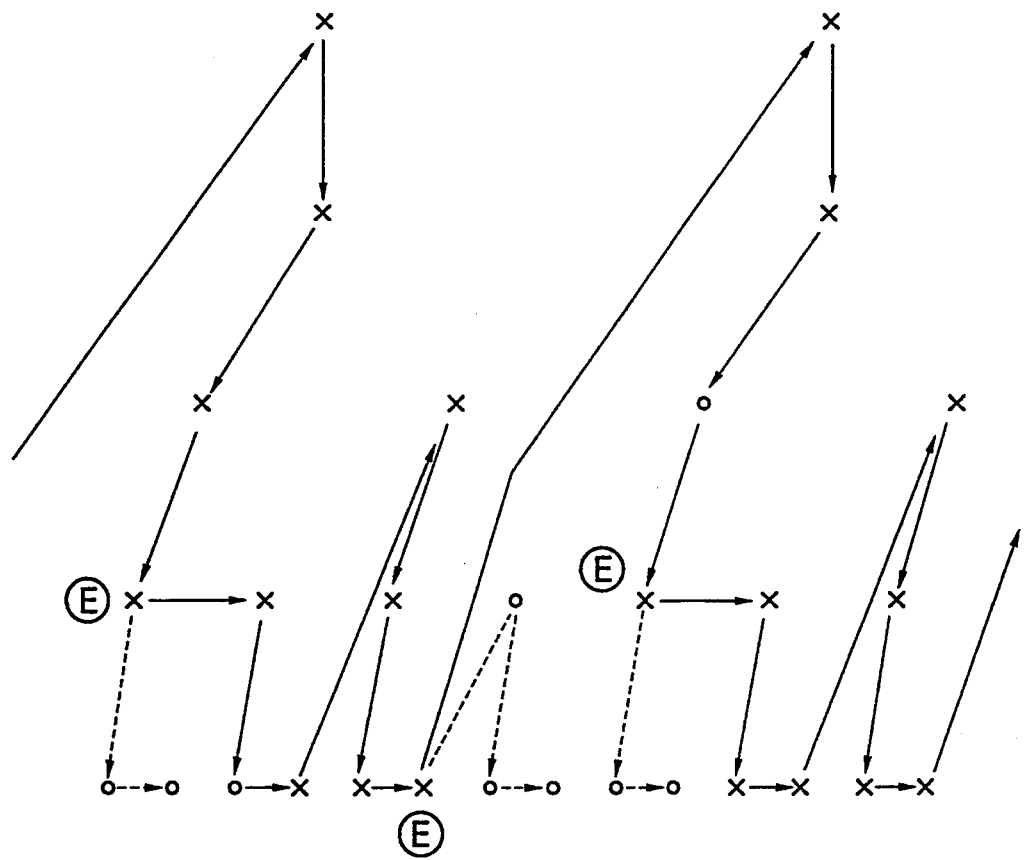
FIG. 19 shows tree structures which include subtrees and are for use in describing operation of the coding circuit illustrated in FIG. 18.

Turning temporarily to FIG. 19, the run components may continuously appear in the sequence of quantized components at the end of scan of each subtree. It is therefore preferred to skip the subtree scan through such run components and to substitute therefor the end of scan code for each skipped scan. The end of scan code is now called the end of subtree code.

In FIG. 19, the subtree scan is indicated by solid lines with arrowheads. The significant components are represented by crisscrosses. The run components are indicated by small circles. Each skipped scan is visualized by dashed lines with arrowheads. When the subtree scan is skipped at one of the significant components, the end of subtree code is placed in the subband coded signal as a Huffman code in the manner indicated by the capital letter "E" enclosed with a circle.

Turning back to FIG. 18, the coding circuit 34 comprises similar parts which are designated by like reference numerals and are similarly operable with likewise named signals. Each time instant between either two adjacent subtrees or a subtree and a tree structure will be called a subtree's edge.

Supplied with the rearranged sampling signal from the sampling instant selector 44 operable in accordance with the equations which are given in either the items (A.0) through (A.5) or the items (B.0) through (B.5), a subtree edge detector 61 detects the subtree edges to produce a subtree edge signal representative of the subtree edges. An end of subtree (EOST) detector 62 is connected to the run length coder 48 and is controlled by the subtree edge signal. Like the final zero-run detector described in conjunction with FIG. 14, the end of subtree detector 62 checks whether or not each run length code is either immediately followed by a subtree edge or intervened by a subtree edge. If a particular run length code is either immediately followed or intervened by a subtree edge, the end of subtree detector 62 substitutes the end of subtree code for the particular run length code. Otherwise, the end of subtree detector 62 supplies the single coder 43 with the significant components and other run length codes which are other than such particular run length codes. The coder 43 encodes the significant components, the other run length codes, and the end of subtree codes into the subband coded signal for supply to the device output terminal 26.

Figure 20:
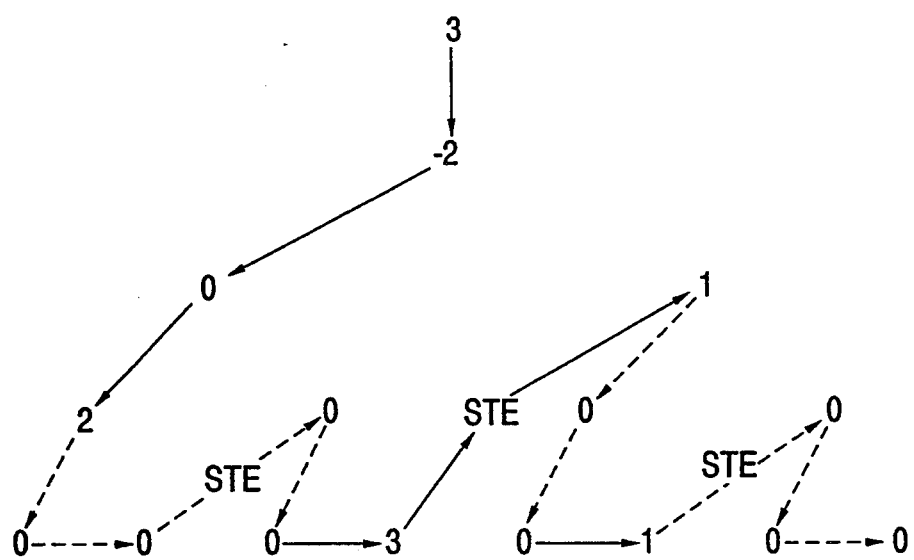
FIG. 20 exemplifies sample values of subband samples of a tree structure.

FIG. 20 will temporarily be referred to. In FIG. 20, the subband or classified samples of one of the tree structures have sample values of (−2), 0, 1, 2, and 3 in the manner exemplified. These subband samples are subjected to the subtree scan indicated by solid lines and dashed lines with arrowheads. Each subtree edge is indicated at STE.

FIG. 18 will again be referred to with FIG. 20 additionally referred to. The quantizer 46 produces sixteen quantized components which may be represented by Q(3), Q(−2), Q(0), Q(2), Q(0), Q(0), Q(0), Q(0), Q(3), Q(1), Q(0), Q(0), Q(1), Q(0), Q(0), and Q(0). The run-level detector 47 produces a sequence of level and run components L(3), L(−2), R(0), L(2), R(0), R(0), R(0), L(3), L(1), R(0), R(0), L(1), R(0), R(0), and R(0), where L and R are indicative of the level and the run components. The run length coder 48 produces a mixed sequence of level components and run length codes L(3), L(−2), R1, L(2), R4, L(3), L(1), R2, L(1), and R3, where Rx represents a run length code indicative of a run length x. Controlled by the subtree edge signal, the end of subtree detector 62 produces another mixed sequence of the level components, the run length codes, and the end of subtree codes L(3), L(−2), R1, L(2), EOST, L(3), L(1), R2, L(1), and EOST.

It is, however, desirable between the length components L(2) and L(3) to divide the end of subtree code into an end of subtree code and a run length code R2. The run-level detector 47 is therefore controlled by the subtree edge signal to produce an improved sequence of level and run components L(3), L(−2), R(0), L(2), R(0), R(0), STE, R(0), R(0), L(3), STE, L(1), R(0), R(0), L(1), STE, and R(0)'s. The run length coder 48 produces an improved sequence of level components and run length codes L(3), L(−2), R1, L(2), R2, R2, L(3), L(1), R2, L(1), and R3. The end of subtree detector 62 produces an improved sequence L(3), L(−2), R1, L(2), EOST, R2, L(3), L(1), R2, L(1), and EOST.

FIGS. 18 through 20 will be reviewed. The subband samples of at least one of the subtrees may include zero-level components immediately followed by a subtree edge. In this instance, the coding section (34) codes the subband samples of the tree structure by suspending scan of the zero-level components and by substituting an end of subtree code EOST in the subband coded signal for the zero-level components.

Figure 21:
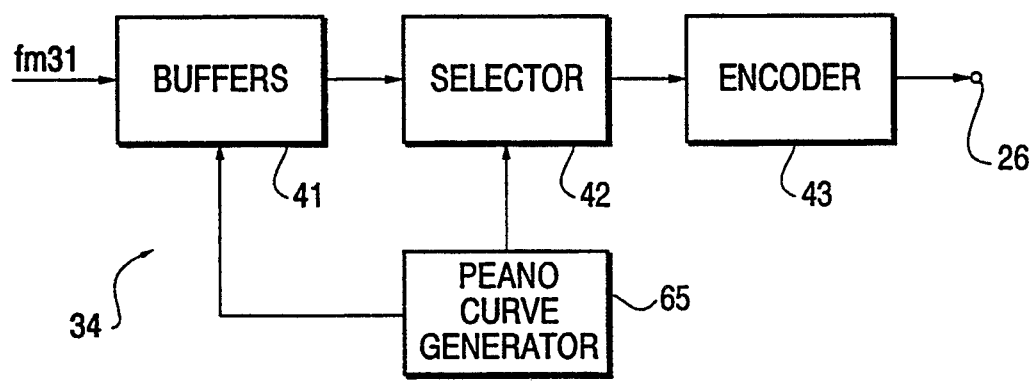
FIG. 21 is a block diagram of a coding circuit for use in a subband coding device according to a sixth embodiment of this invention.

Referring to FIG. 21 with FIGS. 6 and 11 additionally referred to, a coding circuit is once more designated by the reference numeral 34 for use in a subband coding device according to a sixth embodiment of this invention. Except for the coding circuit 34 being illustrated, the subband coding device is not different from that illustrated with reference to FIG. 6. It is once again presumed that the subband samples are classified into the classified samples in the manner described in connection with FIG. 10. The illustrated encoding circuit 34 has a higher efficiency than that operable in compliance with the subtree scan described in conjunction with FIG. 12.

Figure 22:
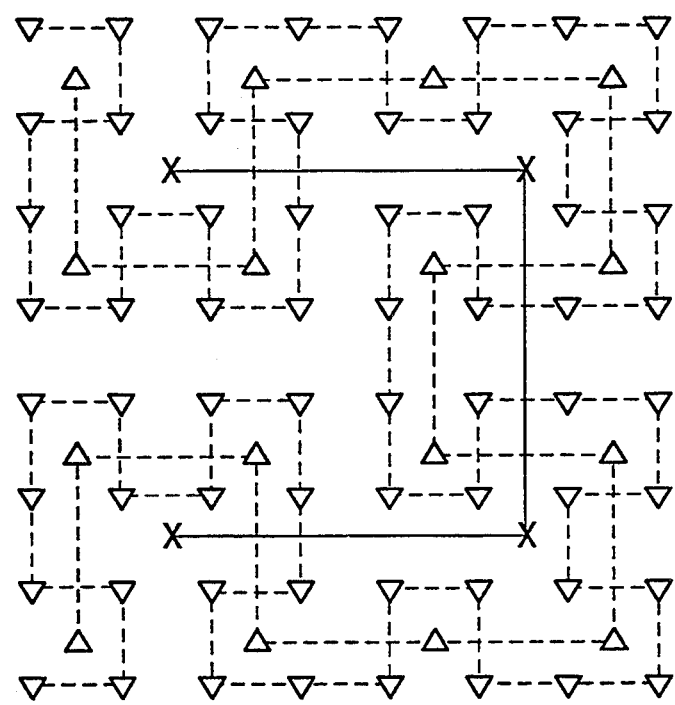
FIG. 22 schematically shows a Peano curve for use in describing operation of the encoding circuit illustrated in FIG. 21.

Turning to FIG. 22, the classified samples of the first and the (2a)-th through the (2c)-th frequency bands are represented by crisscrosses and are scanned in the manner indicated by solid lines. The classified samples of the (3a)-th through the (3c)-th frequency bands are indicated again by triangles are scanned in the manner specified by dash-dot lines. The classified samples of the (4a)-th through the (4c)-th frequency bands are depicted by inverted triangles are scanned along broken lines. The solid, the dash-dot, and the broken lines form a Peano curve as called in the mathematics.

Turning back to FIG. 21, the encoding circuit 34 comprises a Peano curve generator 65 which is supplied with the downsampling signal through a connection (not shown) and is for producing a Peano curve sampling instant signal representative of the Peano curve mentioned in connection with FIG. 22. The subband sample selector 42 is controlled by the Peano curve sampling instant signal to select the classified samples from the subband samples along the Peano curve. It is now understood that the buffers should be at least one random access memory rather than the first-in first-out buffers which are used in the coding circuits 34 described in the foregoing.

FIGS. 2 through 22 will be reviewed. The coding section (34) is for coding the subband samples into a subband coded signal by classifying the subband samples into a plurality of sample groups of classified samples and by coding the classified samples of each sample group access the frequency bands. It should be noted that the classified samples of each sample group are selected from the subband samples of each sample group in accordance with sampling instants of the signal samples and in accordance with combinations of the sampling instants when the signal samples are variable in the one-dimensional and the two-dimensional space, respectively.

When the device input signal represents the signal samples in the one-dimensional space, the coding section is for selecting the classified samples of each sample group in accordance with the sampling instants of a predetermined number, such as four downsampling instants exemplified in conjunction with FIG. 7. When the device input signal represents the signal samples in the two-dimensional space, the coding section is for selecting the classified samples of each sample group in accordance with sampling instant combinations in a predetermined area, such as each of the first signal plane through the fourth common signal plane which are described in conjunction with FIG. 10, wherein each sampling instant combination is a combination of two sampling instants, such as the (1, 1)-th downsampling instants or each of the (1, 2)-th through the (2, 1)-th downsampling instants.

What is claimed is:

1. A subband coding device comprising:

N band-pass filters for band-limiting a device input signal into first to N-th band-limited signals, respectively, said first to N-th band-limited signals each being in a first to N-th frequency band, respectively, where N represents a predetermined natural number;

N downsampling circuits for downsampling said first to N-th band-limited signals into first to N-th subband signals each consisting of subband samples; and single coding means for rearranging sample groups of said subband samples of said first to N-th subband signals into a rearranged signal and for encoding said rearranged signal into a subband coded signal.

2. A subband coding device as claimed in claim 1, wherein said rearranged signal includes a succession of zero-level components, wherein said coding means is for coding said succession of zero-level components into a run length code so that said subband coded signal includes said run length code.

3. A subband coding device as claimed in claim 2, wherein said first through N-th frequency bands are lower and higher frequency bands, wherein said coding means is for coding the subband samples of each of said sample groups in a generally ascending order starting at said first frequency band and ending at said N-th frequency band.

4. A subband coding device as claimed in claim 3, wherein said coding means is for coding said succession of zero-level components into an end of scan code if said succession of zero-level components appears when scan of all of said subband samples comes to an end, said coding means being for placing said end of scan code in said subband coded signal and for stopping the scan of said subband samples as soon as said succession of zero-level components appears.

5. A subband coding device as claimed in claim 3, the subband samples of each of said sample groups being arranged in a tree structure having a succession of subtrees, the subband samples of said tree structure including at least one sample that is other than the subband samples of said subtrees, wherein said coding means is for coding the subband samples of said tree structure by scanning the subband samples of said tree structure starting at said at least one sample in said first frequency band proceeding to the subband samples of a first one of the subtrees in said succession of subtrees and to the subband samples of one of said subtrees that immediately follows said first one of the subtrees in said succession of subtrees.

6. A subband coding device as claimed in claim 5, the subband samples of said subtrees including zero-level components, wherein said coding means is for coding the subband samples of said tree structure and for subjecting said zero-level components to run length coding.

7. A subband coding device as claimed in claim 5, the subband samples of at least one of said subtrees including zero-level components immediately followed by a subtree edge, wherein said coding means is for coding the subband samples of said tree structure by suspending scan of said zero-level components immediately followed by said subtree edge and by substituting an end of subtree code in said subband coded signal for the zero-level components immediately followed by said subtree edge.

8. A subband coding device as claimed in claim 2, wherein said first through N-th frequency bands are lower and higher frequency bands, wherein said coding means is for coding the subband samples of each of said sample groups in a generally descending order starting at said N-th frequency band and ending at said first frequency band.

9. A subband coding device as claimed in claim 8, wherein said coding means is for encoding said succession of zero-level components into a start of scan code if said succession of zero-level components appears when scan of all of said subband samples starts, said coding means being for placing said start of scan code in said subband coded signal and for starting the scan of said subband samples as soon as said succession of zero-level components comes to an end.

10. A subband coding device as claimed in claim 8, the subband samples of each of said sample groups being arranged in a tree structure having a succession of subtrees, the subband samples of said tree structure including at least one sample that is other than the subband samples of said subtrees, wherein said coding means is for coding the subband samples of said tree structure by scanning the subband samples of said tree structure starting at the subband samples of a first one of the subtrees in said succession of subtrees and proceeding to the subband samples of a next one of the subtrees in said succession of subtrees and to said at least one sample in said first frequency band, said next one of the subtrees immediately following said first one of the subtrees in said succession of subtrees.

11. A subband coding device as claimed in claim 10, the subband sample of said subtrees including zero-level components, wherein said encoding means is for encoding the subband samples of said tree structure and for subjecting said zero-level components to run length coding.

12. A subband coding device as claimed in claim 11, the subband samples of at least one of said subtrees including zero-level components immediately preceded by a subtree edge, wherein said coding means is for coding the subband samples of said tree structure by suspending scan of the zero-level components immediately preceded by said subtree edge and by substituting a start of subtree code in said subband coded signal for the zero-level components immediately preceded by said subtree edge.

* * * * *